United States Patent
Uemura et al.

(10) Patent No.: US 7,814,489 B2
(45) Date of Patent: Oct. 12, 2010

(54) PROCESSOR SYSTEM WITH TEMPERATURE SENSOR AND CONTROL METHOD OF THE SAME

(75) Inventors: Goh Uemura, Kawasaki (JP); Kenichi Nagai, Fuchu (JP)

(73) Assignee: Kabushiki Kaisha Toshiba, Tokyo (JP)

(*) Notice: Subject to any disclaimer, the term of this patent is extended or adjusted under 35 U.S.C. 154(b) by 1593 days.

(21) Appl. No.: 11/062,670

(22) Filed: Feb. 23, 2005

(65) Prior Publication Data

US 2006/0095911 A1   May 4, 2006

(30) Foreign Application Priority Data

Nov. 4, 2004   (JP) .............................. 2004-321123

(51) Int. Cl.
G06F 9/46 (2006.01)
G06F 11/30 (2006.01)
G01K 1/08 (2006.01)

(52) U.S. Cl. ...................... 718/103; 718/104; 713/300; 713/320; 713/324; 702/132; 702/183

(58) Field of Classification Search ......... 718/100–108; 702/99–188; 710/260; 714/39; 361/103; 713/300, 320, 324
See application file for complete search history.

(56) References Cited

U.S. PATENT DOCUMENTS

| | | | | |
|---|---|---|---|---|
| 5,339,445 A * | 8/1994 | Gasztonyi | ................... | 713/324 |
| 5,502,838 A * | 3/1996 | Kikinis | ....................... | 713/501 |
| 5,724,591 A * | 3/1998 | Hara et al. | ................... | 713/322 |
| 5,860,137 A * | 1/1999 | Raz et al. | .................... | 711/202 |
| 5,913,068 A | 6/1999 | Matoba | | |
| 6,134,667 A * | 10/2000 | Suzuki et al. | ............... | 713/300 |
| 6,363,490 B1 * | 3/2002 | Senyk | ....................... | 713/300 |
| 6,675,191 B1 * | 1/2004 | Ito | ............................. | 709/102 |
| 6,804,632 B2 * | 10/2004 | Orenstien et al. | ........... | 702/188 |
| 6,934,864 B2 * | 8/2005 | Chu et al. | ................... | 713/324 |
| 7,069,189 B2 * | 6/2006 | Rotem | ........................ | 702/189 |
| 7,072,805 B2 * | 7/2006 | Cascaval et al. | ............ | 702/196 |
| 7,360,102 B2 * | 4/2008 | Inoue | ......................... | 713/300 |
| 2003/0229662 A1 * | 12/2003 | Luick | ......................... | 709/106 |
| 2004/0268166 A1 * | 12/2004 | Farkas et al. | ................ | 713/320 |
| 2005/0044429 A1 * | 2/2005 | Gaskins et al. | ............. | 713/300 |
| 2005/0071701 A1 * | 3/2005 | Luick | ......................... | 713/320 |
| 2005/0120252 A1 * | 6/2005 | Uwatoko | .................... | 713/300 |
| 2005/0216222 A1 * | 9/2005 | Inoue | ......................... | 702/136 |

(Continued)

FOREIGN PATENT DOCUMENTS

JP    8-16531    1/1996

(Continued)

*Primary Examiner*—Meng-Ai An
*Assistant Examiner*—Jennifer N To
(74) *Attorney, Agent, or Firm*—Oblon, Spivak, McClelland, Maier & Neustadt, L.L.P.

(57) ABSTRACT

A processor system includes a plurality of first processors, a temperature sensor, a main memory, and a second processor. The first processors individually process tasks. The temperature sensor measures a temperature of each of the first processors. The main memory stores programs of the tasks processed by the first processors, and a task priority order table containing a relationship between the tasks and task priority numbers. The second processor assigns the tasks to the first processors on the basis of the task priority order table and the temperatures of the first processors measured by the temperature sensor.

14 Claims, 33 Drawing Sheets

U.S. PATENT DOCUMENTS

| | | | |
|---|---|---|---|
| 2005/0278520 A1* | 12/2005 | Hirai et al. | 713/1 |
| 2006/0156041 A1* | 7/2006 | Zaretsky et al. | 713/300 |
| 2007/0143763 A1* | 6/2007 | Adachi et al. | 718/104 |

FOREIGN PATENT DOCUMENTS

| | | |
|---|---|---|
| JP | 8-314578 | 11/1996 |
| JP | 9-138716 | 5/1997 |
| JP | 2000-40067 | 2/2000 |
| JP | 2004-240669 | 8/2004 |

\* cited by examiner

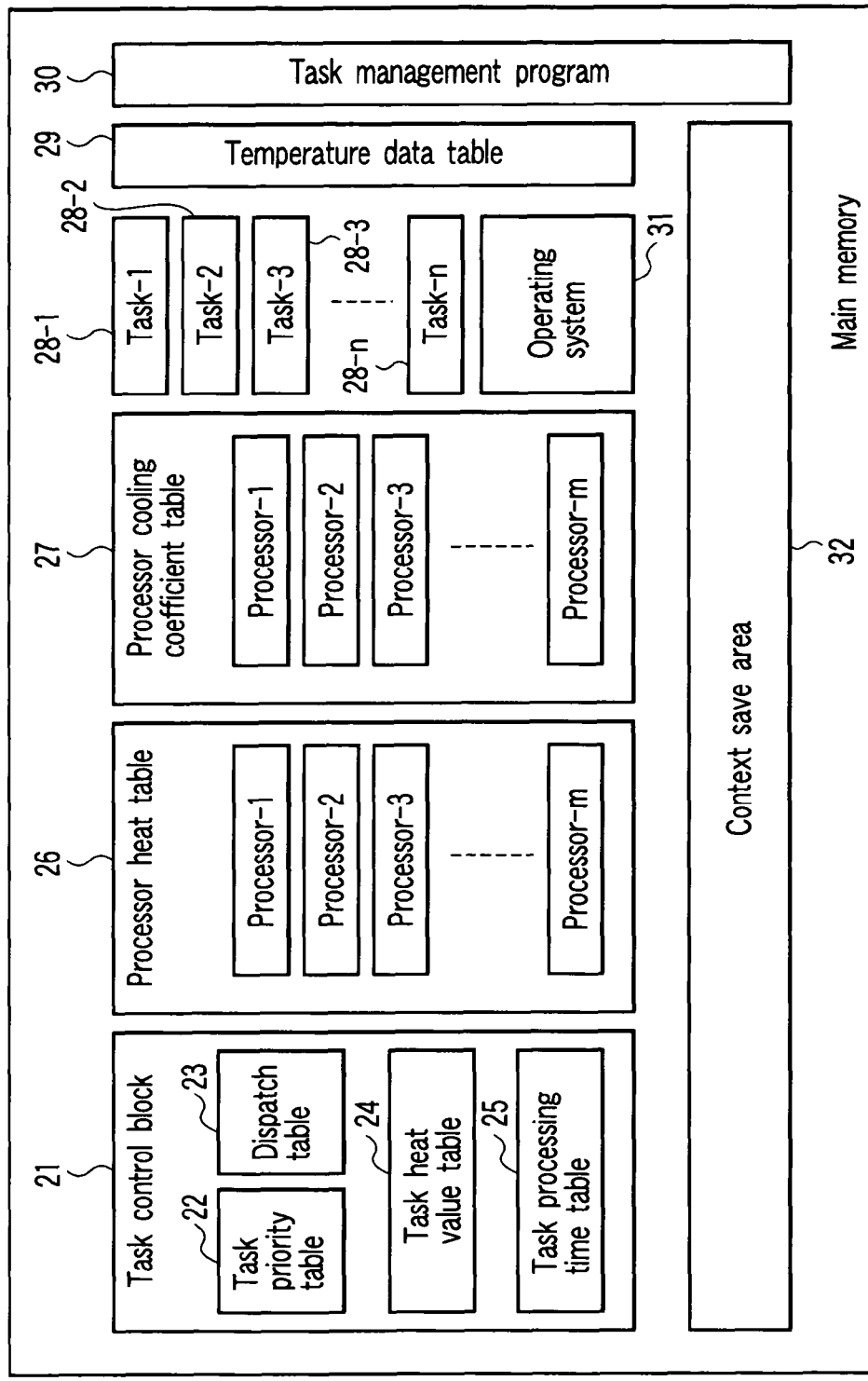
F I G. 2

| Safety temperature | T1 > T |
|---|---|
| Caution temperature | T1 ≦ T < T2 |
| Danger temperature | T2 ≦ T < T3 |
| Absolute danger temperature | T3 ≦ T |

Temperature data table

FIG. 5

| Task | Task priority number |
|---|---|
| Task-1 | 1 |
| Task-2 | 2 |
| Task-3 | 3 |
| Task-4 | 4 |
| ⋮ | ⋮ |
| Task-n | n |

Task priority table

FIG. 6

| Processor | Temperature |
|---|---|
| Processor-1 | Tm1 |
| Processor-2 | Tm2 |
| Processor-3 | Tm3 |
| Processor-4 | Tm4 |
| ⋮ | ⋮ |
| Processor-(m−1) | Tm(m−1) |
| Processor-m | Tmm |

$Tm1 < Tm2 < \cdots Tm(m-1)$

F I G. 7

| Processor | Task |
|---|---|
| Processor-1 | Task-1 |
| Processor-2 | Task-2 |
| Processor-3 | Task-3 |
| Processor-4 | Task-4 |
| ⋮ | ⋮ |
| Processor-(m−1) | Task-(m−1) |

Dispatch table

F I G. 8

| Task | Processing time |
|---|---|
| Task-1 | p1 |
| Task-2 | p2 |
| Task-3 | p3 |
| Task-4 | p4 |
| ⋮ | ⋮ |
| Task-n | pn |

Task processing time table

| Processor | Task | Current temperature | Decrease in temperature |
|---|---|---|---|
| Processor-1 | Task-1 | Tm1 | Td1 |
| Processor-2 | Task-2 | Tm2 | Td2 |
| Processor-3 | Task-3 | Tm3 | Td3 |
| Processor-4 | Task-4 | Tm4 | Td4 |
| ⋮ | ⋮ | ⋮ | ⋮ |
| Processor-(m−1) | Task-(m−1) | Tm(m−1) | Td(m−1) |

Processor cooling coefficient table

| Task | Increase in temperature |
|---|---|
| Task-1 | Ti1 |
| Task-2 | Ti2 |
| Task-3 | Ti3 |
| Task-4 | Ti4 |
| ⋮ | ⋮ |
| Task-n | Tin |

Task heat value table

F I G. 1 5

| Processor | Task | Expected temperature |
|---|---|---|
| Processor-1 | Task-1 | Theat1 |
| Processor-2 | Task-2 | Theat2 |
| Processor-3 | Task-3 | Theat3 |
| Processor-4 | Task-4 | Theat4 |
| ⋮ | ⋮ | ⋮ |
| Processor-(m−1) | Task-(m−1) | Theat(m−1) |

Theat=Tm+Ti−Td

Processor heat table

F I G. 1 6

| Processor | Task |
|---|---|
| Processor-1 | Stop use |
| Processor-2 | Re-dispatch |
| Processor-3 | Re-dispatch |
| Processor-4 | Re-dispatch |
| ⋮ | ⋮ |
| Processor-(m−1) | Re-dispatch |

Dispatch table

FIG. 19

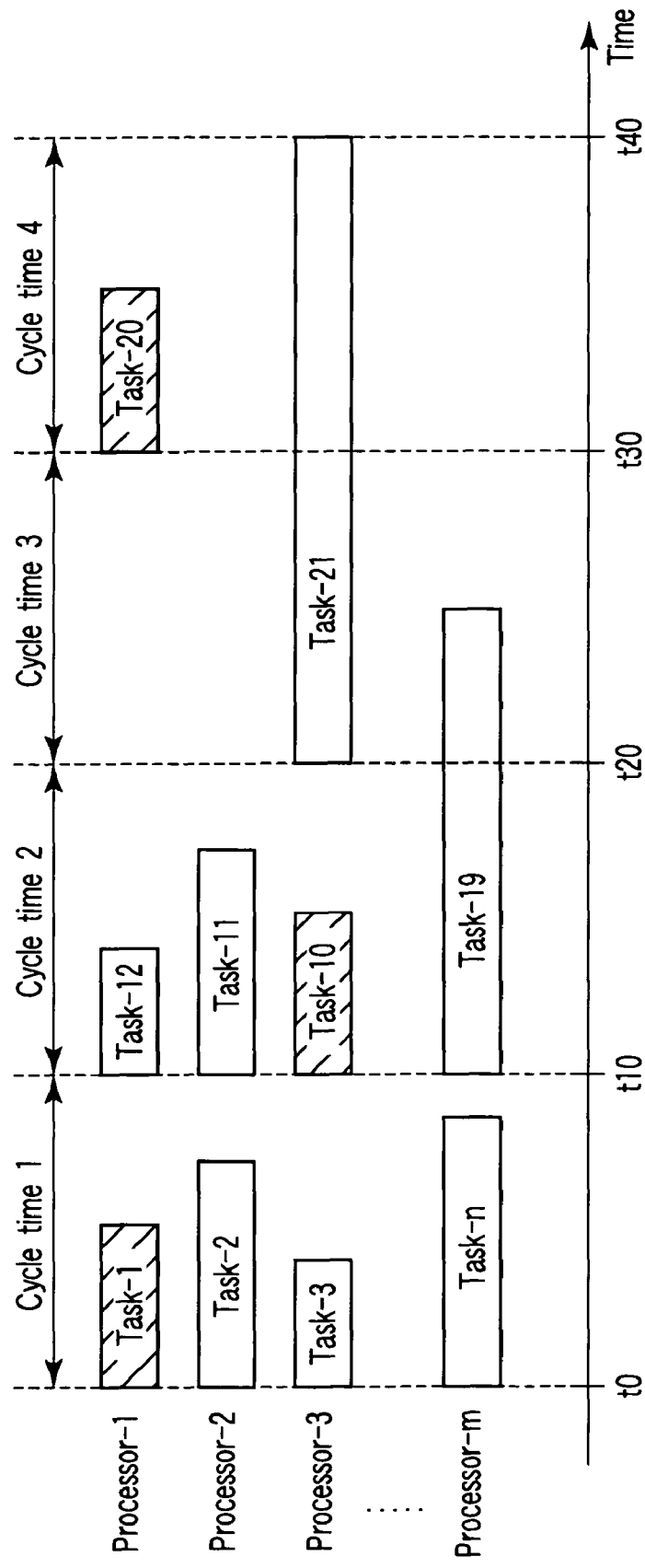
F I G. 21
Task-1, Task-10, Task-20 : Real time application

| Processor | Task | Current temperature | Decrease in temperature |
|---|---|---|---|
| Processor-1 | Task-1 | Tm1 | Td11 |
| | Task-2 | Tm1 | Td12 |
| | ⋮ | ⋮ | ⋮ |
| | Task-n | Tm1 | Td1n |
| Processor-2 | Task-1 | Tm2 | Td21 |
| | Task-2 | Tm2 | Td22 |
| | ⋮ | ⋮ | ⋮ |
| | Task-n | Tm2 | Td2n |
| Processor-3 | Task-1 | Tm3 | Td31 |
| | Task-2 | Tm3 | Td32 |
| | ⋮ | ⋮ | ⋮ |
| | Task-n | Tm3 | Td3n |
| ⋮ | ⋮ | ⋮ | ⋮ |
| Processor-(m−1) | Task-1 | Tm(m−1) | Td(m−1)1 |
| | Task-2 | Tm(m−1) | Td(m−1)2 |
| | ⋮ | ⋮ | ⋮ |
| | Task-n | Tm(m−1) | Td(m−1)n |

Processor cooling coefficient table

FIG. 25

| Processor | Task | Expected temperature |
|---|---|---|
| Processor-1 | Task-1 | Theat11 |
| | Task-2 | Theat12 |
| | ⋮ | ⋮ |
| | Task-n | Theat1n |
| Processor-2 | Task-1 | Theat21 |
| | Task-2 | Theat22 |
| | ⋮ | ⋮ |
| | Task-n | Theat2n |
| Processor-3 | Task-1 | Theat31 |
| | Task-2 | Theat32 |
| | ⋮ | ⋮ |
| | Task-n | Theat3n |
| ⋮ | ⋮ | ⋮ |
| Processor-(m−1) | Task-1 | Theat(m−1)1 |
| | Task-2 | Theat(m−1)2 |
| | ⋮ | ⋮ |
| | Task-n | Theat(m−1)n |

Processor heat table

F I G. 2 6

| Processor | Heat source | Coefficient | Current temperature | Affection temperature |
|---|---|---|---|---|
| Processor-1 | Processor-2 | c12 | Tm2 | Taff12 |
| | Processor-3 | c13 | Tm3 | Taff13 |
| | ⋮ | ⋮ | ⋮ | ⋮ |
| | Processor-m | c1m | Tmm | Taff1m |
| Processor-2 | Processor-1 | c21 | Tm1 | Taff21 |
| | Processor-3 | c23 | Tm3 | Taff22 |
| | ⋮ | ⋮ | ⋮ | ⋮ |
| | Processor-m | c2m | Tmm | Taff2m |
| Processor-3 | Processor-1 | c31 | Tm1 | Taff31 |
| | Processor-2 | c32 | Tm2 | Taff32 |
| | ⋮ | ⋮ | ⋮ | ⋮ |
| | Processor-m | c3m | Tmm | Taff3m |
| ⋮ | ⋮ | ⋮ | ⋮ | ⋮ |
| Processor-m | Processor-1 | cm1 | Tm1 | Taffm1 |
| | Processor-2 | cm2 | Tm2 | Taffm2 |
| | ⋮ | ⋮ | ⋮ | ⋮ |
| | Processor-(m−1) | cm(m−1) | Tm(m−1) | Taffm(m−1) |

Affection temperature table

FIG. 31

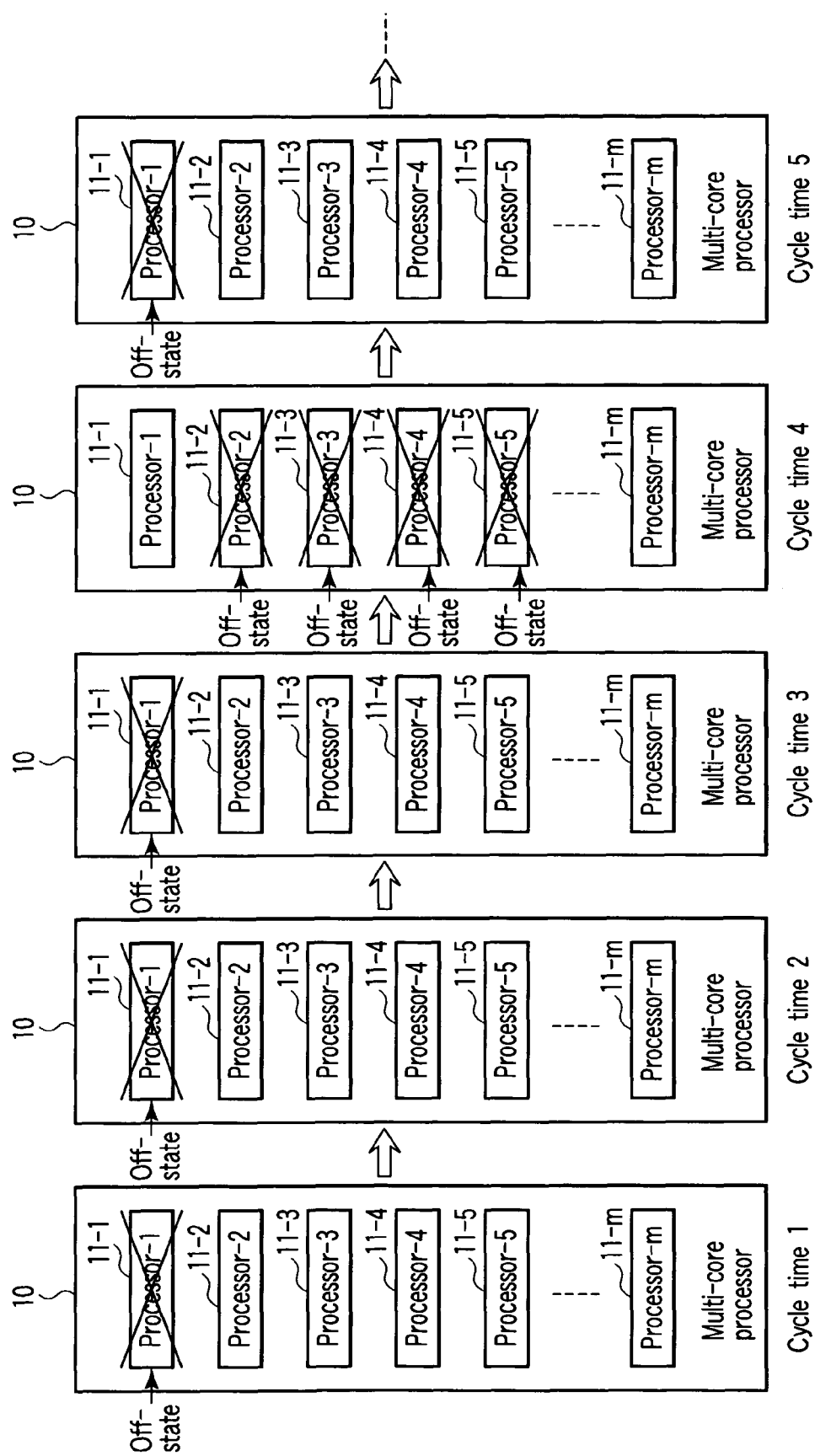
F I G. 35

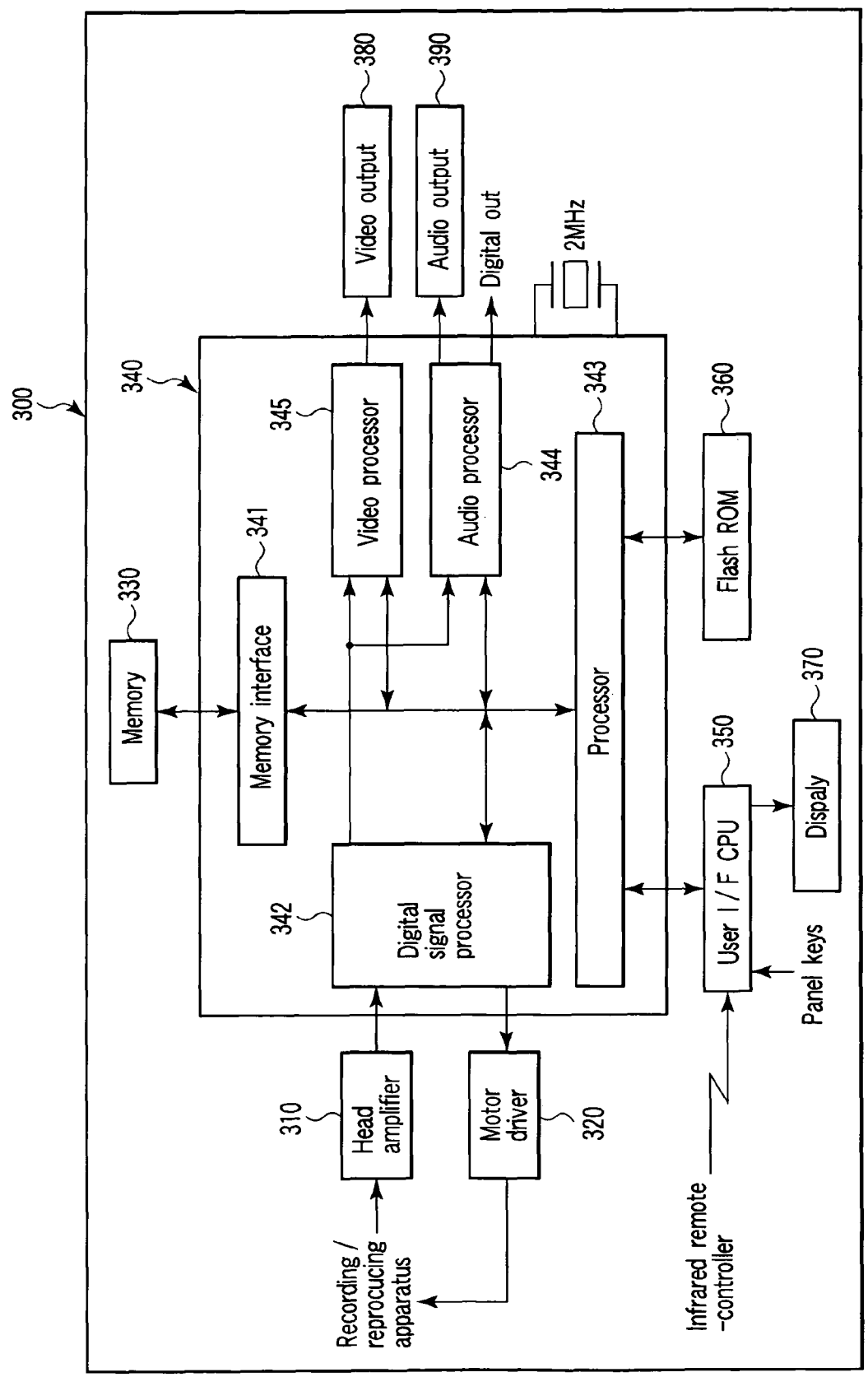
F I G. 39

PROCESSOR SYSTEM WITH TEMPERATURE SENSOR AND CONTROL METHOD OF THE SAME

CROSS-REFERENCE TO RELATED APPLICATIONS

This application is based upon and claims the benefit of priority from prior Japanese Patent Application No. 2004-321123, filed Nov. 4, 2004, the entire contents of which are incorporated herein by reference.

BACKGROUND OF THE INVENTION

1. Field of the Invention

The present invention relates generally to a processor system and a control method thereof, and more particularly to a method of managing an LSI that includes a plurality of processors in a case where the temperatures of the processors increase.

2. Description of the Related Art

There is known a conventional semiconductor integrated circuit including a plurality of CPUs (processors) (hereinafter referred to as "multi-core processor"). In the multi-core processor, the plural processors execute individual tasks, and the temperatures of the processors increase in accordance with the operational states of the processors. If the temperature of the processor rises to a predetermined level, the normal operation of the processor is disabled, and the processor may physically be damaged.

In a proposed technique for solving the problem, when the temperature of a processor rises to a predetermined level, the operation of the processor is stopped or the processing load on the processor is decreased, thereby preventing a further temperature rise. Such techniques have been disclosed, for instance, in Jpn. Pat. Appln. KOKAI Publication No. 8-314578 or Jpn. Pat. Appln. KOKAI Publication No. 2000-40067.

In these techniques, however, the processing of an application is delayed on the system side using the processor. In particular, if the processor, which is rendered inoperable, has executed an important process in the application, a serious fault would occur on the system side.

BRIEF SUMMARY OF THE INVENTION

A processor system according to an aspect of the present invention includes: a plurality of first processors which individually process tasks;

a temperature sensor which measures a temperature of each of the first processors;

a main memory which stores programs of the tasks processed by the first processors, and a task priority order table containing a relationship between the tasks and task priority numbers; and a second processor which assigns the tasks to the first processors on the basis of the task priority order table and the temperatures of the first processors measured by the temperature sensor.

A control method of a processor system having a plurality of processors, according to another aspect of the present invention, includes:

measuring temperatures of the plurality of processors;

assigning tasks to the processors in accordance with a process priority order and the temperatures of the processors;

expecting a temperature to which the temperature of each processor would reach after a unit time for executing one process;

causing the processor, the expected temperature exceeds a predetermined temperature, to save the task assigned to the processor to a main memory;

causing the processor, the expected temperature of which does not exceed the predetermined temperature, to process the assigned task.

BRIEF DESCRIPTION OF THE SEVERAL VIEWS OF THE DRAWING

FIG. 2 is a conceptual diagram of a main memory that is included in the processor system according to the first embodiment of the invention, FIG. 2 illustrating memory areas in the main memory and information stored in the memory areas;

FIG. 5 is a conceptual diagram of a temperature data table that is stored in the main memory of the processor system according to the first embodiment of the invention;

FIG. 6 is a conceptual diagram of a task priority table that is stored in the main memory of the processor system according to the first embodiment of the invention;

FIG. 7 shows a relationship between processors, which are included in a multi-core processor of the processor system according to the first embodiment of the invention, and their current temperatures;

FIG. 8 is a conceptual diagram of a dispatch table that is stored in the main memory of the processor system according to the first embodiment of the invention;

FIG. 15 is a conceptual diagram of a task heat value table that is stored in the main memory of the processor system according to the first embodiment of the invention;

FIG. 16 is a conceptual diagram of a processor heat table that is stored in the main memory of the processor system according to the first embodiment of the invention;

FIG. 19 is a conceptual diagram of a dispatch table that is stored in the main memory of the processor system according to the first embodiment of the invention;

FIG. 21 is a time chart that illustrates the state of the multi-core processor that is included in the processor system according to the first embodiment of the invention;

FIG. 25 is a conceptual diagram of a processor cooling coefficient table that is stored in the main memory of the processor system according to the second embodiment of the invention;

FIG. 26 is a conceptual diagram of a processor heat table that is stored in the main memory of the processor system according to the second embodiment of the invention;

FIG. 31 is a conceptual diagram of an affection temperature table that is stored in the main memory of the processor system according to the fourth second embodiment of the invention;

FIG. 35 is a block diagram of a multi-core processor that is included in a processor system according to a sixth embodiment of the invention, FIG. 35 illustrating a transition in operation with time;

FIG. 39 is a block diagram of a recording/reproducing apparatus, which includes the processor system according to the first to sixth embodiments of the present invention.

DETAILED DESCRIPTION OF THE INVENTION

Figure 1:
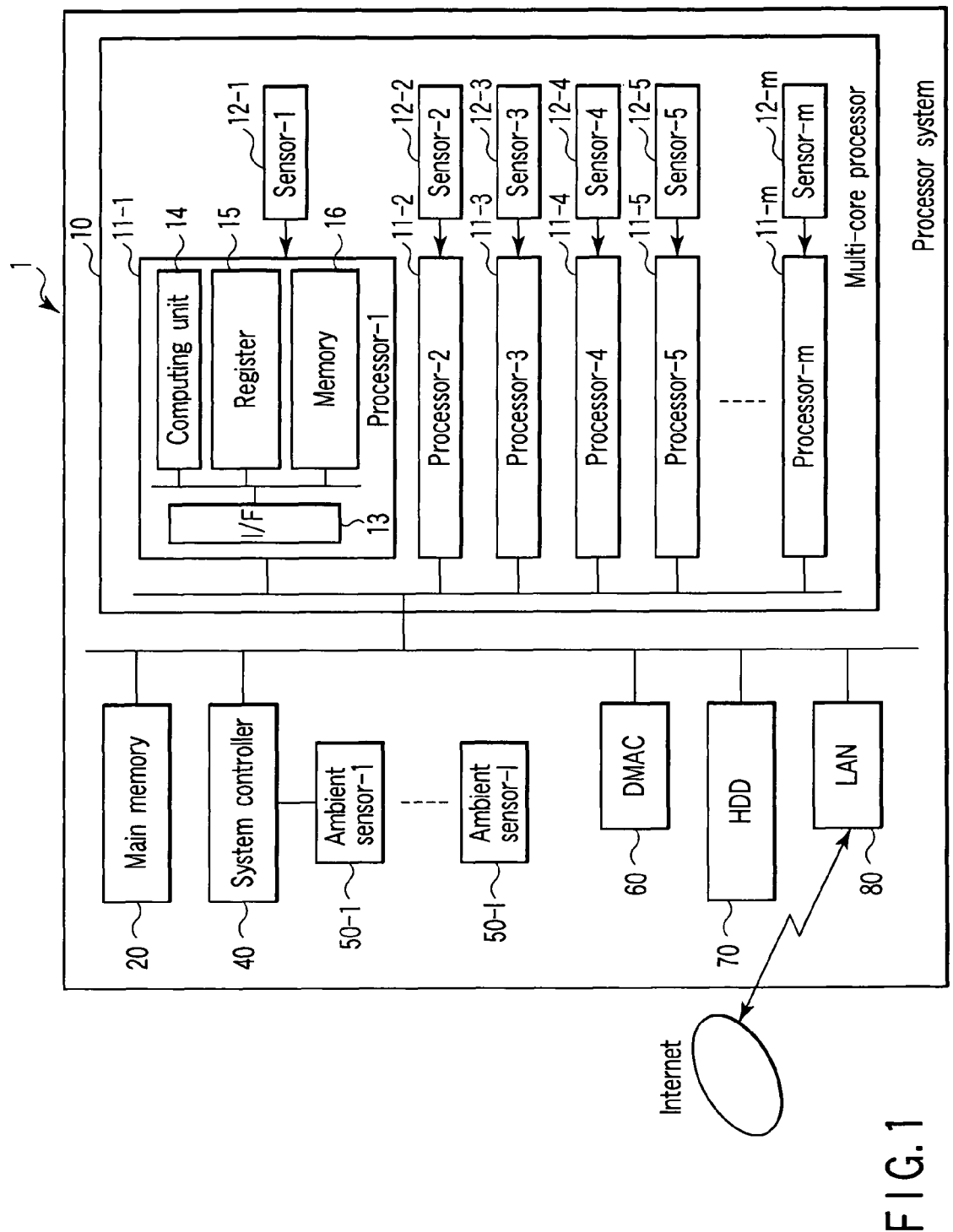
FIG. 1 is a block diagram of a processor system according to a first embodiment of the present invention.

A processor system and a control method thereof according to a first embodiment of the present invention will now be described with reference to FIG. 1. FIG. 1 is a block diagram of the processor system according to the embodiment.

The processor system 1 according to the embodiment, as shown in FIG. 1, comprises a multi-core processor 10, a main memory 20, a system controller 40, ambient temperature sensors 50-1 to 50-$l$ ($l$: natural number of 1 or more), a DMA (Direct Memory Access) controller 60, a hard disk drive 70, and a LAN adapter 80. These components are interconnected over a bus to enable mutual data communication.

The multi-core processor 10 comprises an m-number (m: natural number of 2 or more) of processors 11-1 to 11-$m$, and temperature sensors 12-1 to 12-$m$ that are provided in association with the processors 11-1 to 11-$m$.

The processors 11-1 to 11-$m$ are interconnected over an internal bus to enable mutual data communication. Each of the processors 11-1 to 11-$m$ comprises an interface (I/F) 13, a computing unit 14, a register 15 and a memory 16. The interface 13 controls transmission/reception of signals between the processor, 11-1 to 11-$m$, and the outside. The memory 16 stores a program that is read out of the main memory 20. The computing unit 14 executes a task on the basis of the program that is stored in the memory 16. The register 15 temporarily stores various parameters that are used when the computing unit 14 executes the task. The register 15 includes a control register and an arithmetic register. The processors 11-1 to 11-$m$ with the above-described structure execute programs independently from each other and execute assigned tasks. The processors 11-1 to 11-$m$ are formed, for example, in a single chip. For example, an eDRAM (embedded Dynamic Random Access Memory) is usable as each memory 16. The temperature sensors 12-1 to 12-$m$ measure the temperatures of the associated processors 11-1 to 11-$m$.

The main memory 20 stores programs and data that are necessary for the operations of the processors 11-1 to 11-$m$. The programs and data that are stored in the main memory 20 will be described later in detail.

The system controller 40 arbitrates, for example, between the processors 11-1 to 11-$m$ in the multi-core processor 10. The ambient temperature sensors 50-1 to 50-1 are connected to the system controller 40, and the system controller 40 can measure ambient temperatures.

The DMA controller 60 executes DMA transfer of data between the memories 16 in the processors 11-1 to 11-$m$ of the multi-core processor 10, or between the memories 16 and the main memory 20.

The hard disk drive 70 stores data that is necessary for the operation of the multi-core processor 70.

The LAN adapter 80 connects the processor system 1 to a LAN or the Internet.

In the processor system 1 with the above-described structure, the processors 11-1 to 11-$m$ can share the main memory 20, and the processors 11-1 to 11-$m$ can operate independently. The temperature information of each processor, 11-1 to 11-$m$, can be read out through the processor, 11-1 to 11-$m$. In the description below, however, it is assumed that the operating system runs in one of the processors 11-1 to 11-*m* to control the other processors, and the temperature information is processed by this processor.

Next, the operation of the multi-core processor 10 in the processor system 1 is described. In particular, attention is paid to the relationship between the variation in temperature and the assignment (dispatch) of tasks. FIG. 2 is a conceptual diagram of the internal structure of the main memory 20. FIG. 2 shows information that is stored in the main memory 20 and is necessary for task dispatch.

As is shown in FIG. 2, the main memory 20 includes a task control block 21, a processor heat table 26, a processor cooling coefficient table 27, task programs 28-1 to 28-*n* (n: natural number of 1 or more), a temperature data table 29, a task management program 30, an operating system 31, and a context save area 32.

The task control block 21 includes a task priority table 22, a dispatch table 23, a task heat value table 24 and a task processing time table 25. The task priority table 22 contains priority order information relating to the order of priority of a plurality of tasks to be processed. The dispatch table 23 contains information on correspondency between the tasks and the processors 11-1 to 11-*m*. The task heat value table 24 contains information on the relationship between the tasks and the temperature increases of the processors 11-1 to 11*m* at the time when the tasks are executed. The task processing time table 25 contains information on the relationship between the tasks and the processing time that is needed for executing each task.

The processor heat table 26 contains temperature information relating to expected temperatures of the processors 11-1 to 11-*m*, to which the temperatures of the processors 11-1 to 11-*m* would finally reach when the tasks are executed on the basis of the correspondency in the dispatch table 23.

The processor cooling coefficient table 27 contains temperature information relating to temperature decreases of the processor, 11-1 to 11-*m* in accordance with the passing of free time (idle time) after the processors 11-1 to 11-*m* execute the tasks on the basis of the correspondency information in the dispatch table 23.

The task programs 28-1 to 28-*n* are execution programs of an n-number of tasks. The number n of tasks may be greater or less than the number m of processors 11-1 to 11-*m*.

The temperature data table 29 contains information relating to a temperature range in which the operation of the processors 11-1 to 11-*m* is ensured, and to an upper limit temperature at which there is a possibility of damage.

The task management program 30 is a program for dispatching the n-number of tasks to the processors 11-1 to 11-*m*.

The context save area 32 stores data that is necessary for restart of a task when the task is saved from the processor, 11-1 to 11-*m*. The task save is described later in detail.

Specific examples of the information that is stored in the main memory 20 will be described along with the method of task dispatch. The operations of the multi-core processor 11 are described in order.

<System Initialization>

At first (e.g. at time of power-on), system initialization is executed. In the initialization, the operating system 31 creates or loads task information relating to tasks, which are executed by the system, in the main memory 20. The task information includes, for instance, the task priority table 22, dispatch table 23, task heat value table 24, task processing time table 25, processor heat table 26, processor cooling coefficient table 27, task programs 28-1 to 28-*n*, temperature data table 29 and task management program 30, which have been explained with reference to FIG. 2. Further, the context save area 32 is secured in the main memory 20. The operating system 31 also sets a cycle (e.g. duration of one cycle) of task processing.

At the stage of initialization, a processor is determined, which executes control of the other processors, task dispatch, data save and arbitration between the processors. In the description below, assume that the processor 11-*m* executes these functions. Needless to say, these functions may be executed by another processor, 11-1 to 11-(*m*−1), or by the system controller 40.

Figure 3:
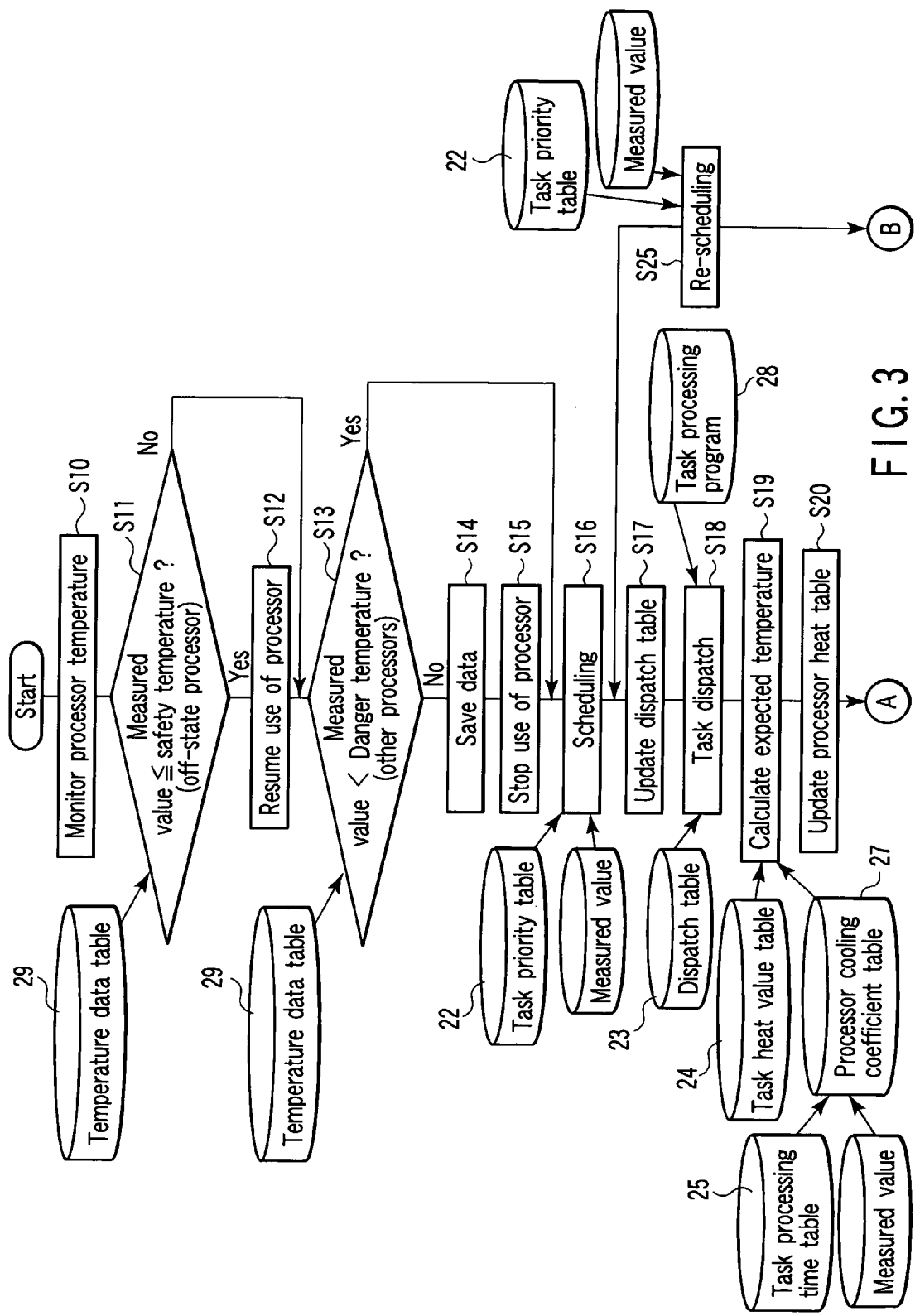
FIG. 3 and FIG. 4 are flow charts illustrating a control method of the processor system according to the first embodiment of the invention.
Figure 4:
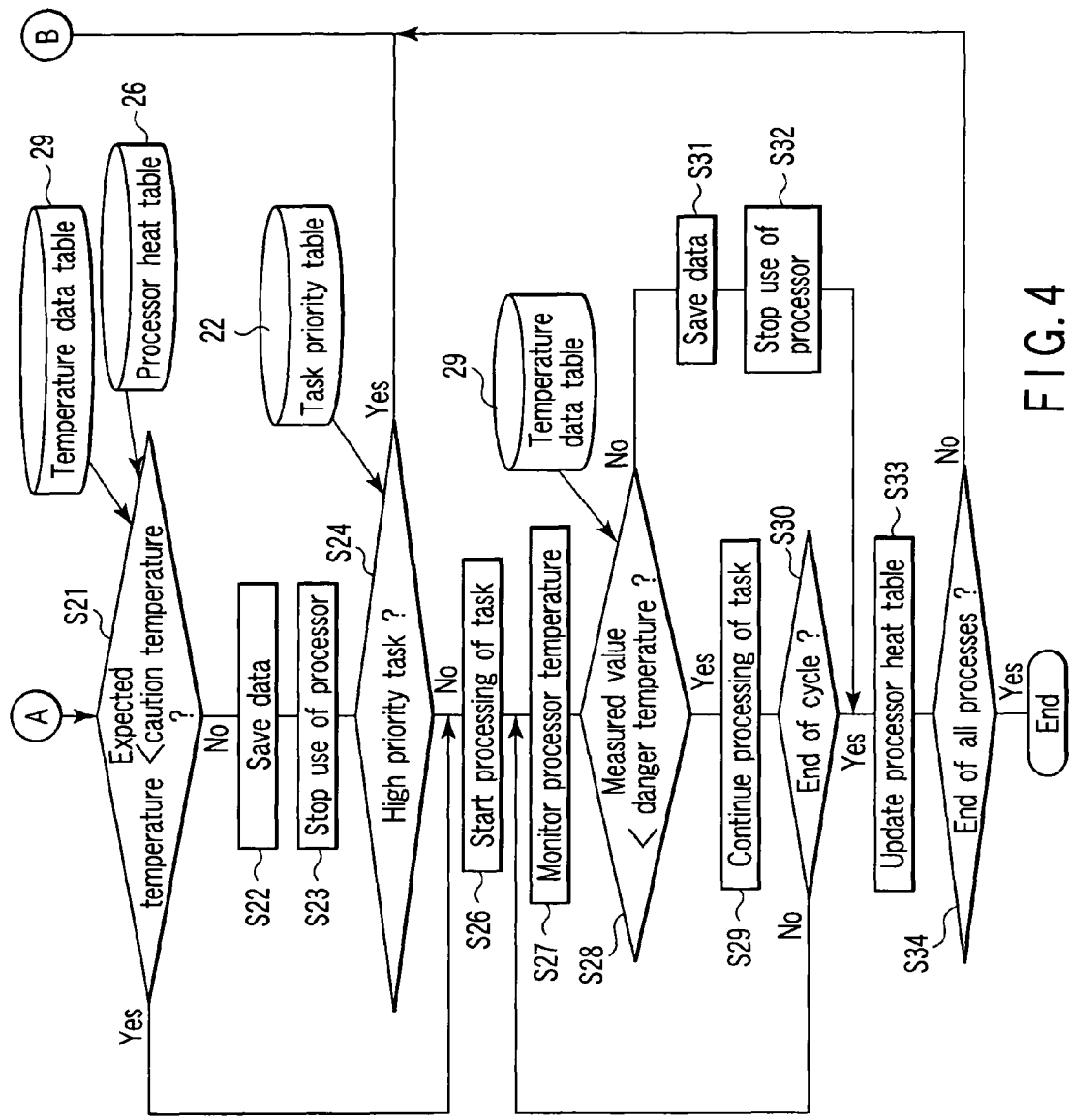

To start with, the processor 11-*m* reads out the task management program 30 from the main memory 20. The processor 11-*m* executes a process, which is illustrated in FIG. 3 and FIG. 4, according to the task management program 30. The processor 11-*m* monitors the temperatures of the processors 11-1 to 11-(*m*−1) using the temperature sensors 12-1 to 120-(*m*−1) (step S10). The processor 11-*m* reads out the temperature data table 29 from the main memory 20 and compares a safety temperature in the temperature data table 29 with the temperature of the processor that is set in an inoperable state (step S11). An example of the temperature data table 29 is explained with reference to FIG. 5. FIG. 5 is a conceptual diagram of the temperature data table 29.

As is shown in FIG. 5, the temperature information table 29 contains information relating to, for example, a safety temperature, a caution temperature, a danger temperature and an absolute danger temperature of the processor, 11-1 to 11-*m*. The safety temperature is a temperature at which the temperature of the processor is sufficiently low and the normal operation of the processor is fully ensured. In the example of FIG. 5, the safety temperature is a temperature that is less than T1. The caution temperature is a temperature at which the temperature of the processor is higher than the safety temperature but the normal operation of the processor is ensured. In the example of FIG. 5, the caution temperature is a temperature that is T1 or higher and is lower than T2. The danger temperature is a temperature at which the temperature of the processor is higher than the caution temperature and the normal operation of the processor is not ensured. In the example of FIG. 5, the danger temperature is a temperature that is T2 or higher and is lower than T3. The absolute danger temperature is a temperature at which the temperature of the processor is higher than the danger temperature and the processor is possibly damaged by heat. In the example of FIG. 5, the absolute danger temperature is a temperature that is T3 or higher. In the example of FIG. 5, only one kind of temperature information table 29 is created. That is, the temperature information table 29 is commonly used for the processors 11-1 to 11-*m*. However, a plurality of temperature information tables 29 may be provided for the respective processors 11-1 to 11-*m*. The temperature information table 29 is prepared in advance by the operation of a computer simulator or the operation of an actual machine.

In step S11, the use of a processor, which is in the inoperable state and has a temperature not higher than the safety temperature, is resumed (step S12). A processor, which is not in operation and has a temperature higher than the safety temperature, is determined to be still unusable.

If there are other processors that are in operation, the temperature of each processor is compared with the danger temperature (step S13). If there is no processor whose temperature is in the danger temperature range, the initialization is completed. If there is a processor whose temperature is in the danger temperature range, the data that is associated with this processor is saved (step S14) and the use of the processor is stopped (step S15). The data save will be described later in detail.

Steps S10 to S15 are executed by the system controller 40. Thereafter, the role of task assignment or the role of arbitration may be transferred to any one of usable processors (the processor 11-*m* in the above example).

<Task Dispatch>

If the initialization is finished, the processor 11-*m* starts assignment of tasks to the processors 11-1 to 11-(*m*–1). To start with, on the basis of the current temperatures of the processors 11-1 to 11-(*m*–1) that are obtained by the temperature sensors 12-1 to 12-(*m*–1) and the task priority table 22 that is read out of the main memory 20, the processor 11-*m* sets the order of execution of tasks and determines how the tasks are assigned to the processors (step S16; this process is referred to as "scheduling").

There are two methods of scheduling: a method in which the order of assignment is dynamically changed during the operations of processors, and a method in which the order of assignment is statically determined prior to the operations of processors. The task assignment is executed mainly on the basis of task priority information. In the present system, scheduling is statically executed in consideration of not only the priority but also the heat amount, and subsequently assignment (dispatch) to processors is executed. While processing is actually executed, the scheduling and dispatch are dynamically performed in consideration of temperature variations in the subsequent time. Dispatch is executed by DMA transfer from the main memory to the memory of the associated processor core or to the associated processor core area in the main memory.

The present process is described in detail. At the start of the scheduling, the processor 11-*m* reads out the task priority table 22 from the main memory 20. An example of the task priority table 22 is described with reference to FIG. 6. FIG. 6 is a conceptual diagram of the task priority table 22.

As is shown in FIG. 6, the task priority table 22 indicates the relationship between individual tasks and the order of priority of execution of the tasks. In the present embodiment, it is assumed that an n-number of tasks TASK-1 to TASK-n have priority numbers 1 to n respectively.

The processor 11-*m* executes scheduling on the basis of the priority number of the tasks and the temperatures of the processors 11-1 to 11-(*m*–1). Assume now that the temperatures of the processors 11-1 to 11-(*m*–1) are as shown in FIG. 7. That is, the processor 11-1 has a lowest temperature. The processor 11-*m* causes the processor 11-1 to execute the task TASK-1 that has the highest priority number. Then, the processor 11-*m* causes the other processors, in succession from the one with a lowest temperature, to execute the tasks on the basis of the priority numbers.

Upon completion of the scheduling, the processor 11-*m* updates the dispatch table 23 that is read out of the main memory 20 (step S17). FIG. 8 shows an example of the dispatch table 23. As shown in FIG. 8, the dispatch table 23 contains the relationship between the processors 11-1 to 11-(*m*–1) and the tasks that are to be executed by the processors 11-1 to 11-(*m*–1). In the example of FIG. 8, each processor executes only one task. Alternatively, one processor may be made to execute a plurality of tasks.

Based on the dispatch table 22 that is updated in step S17, the processor 11-*m* actually assigns (i.e. dispatches) tasks to the processors 11-1 to 11-(*m*–1) (step S18). Specifically, as shown in FIG. 8, the tasks TASK-1 to TASK-(m–1) are dispatched to the processors 11-1 to 11-(*m*–1).

Figure 9:
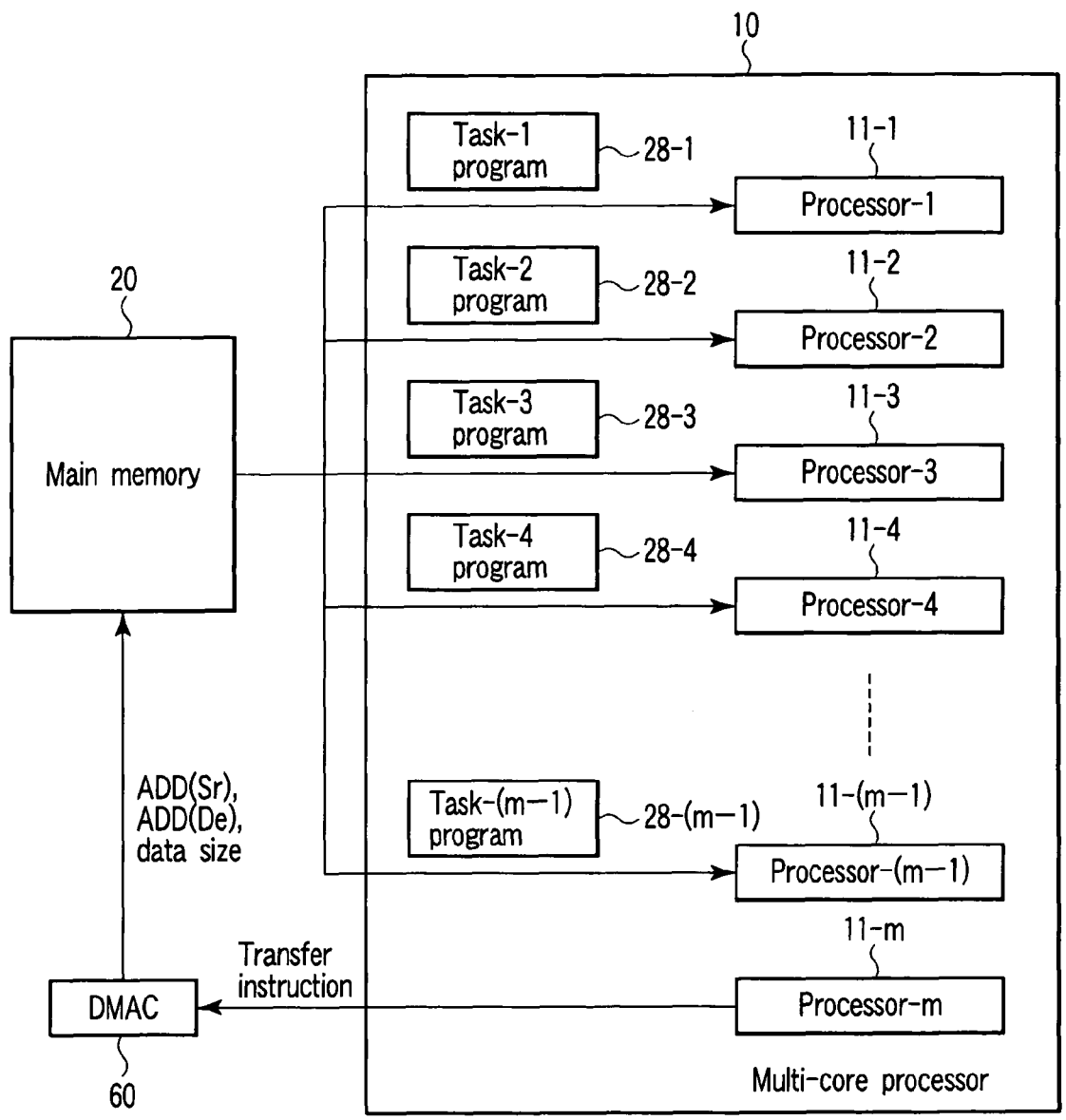
FIG. 9 is a block diagram of the processor system according to the first embodiment of the invention, FIG. 9 illustrating a scheme of DMA transfer of a task program from the main memory.

FIG. 9 is a block diagram that shows the multi-core processor 10, main memory 20 and DMA controller 60 at the time of task dispatch. As is shown in FIG. 9, the processor 11-*m* instructs the DMA controller 60 to transfer task programs 28-1 to 28-(*m*–1) from the main memory 20 to the processors 11-1 to 11-(*m*–1). Then, the DMA controller 60 delivers to the main memory 20 addresses ADD(Sr) in the main memory 20, at which the respective task programs are stored, data sizes thereof, and addresses ADD(De) in the memories 16 of the processors 11-1 to 11-(*m*–1). The programs are transferred to the memories 16 of the respective processors. In this case, not only the task programs 28-1 to 28-(*m*–1) but also the data that is needed for executing the tasks are transferred to the processors 11-1 to 11-(*m*–1) at the same time.

Figure 10:
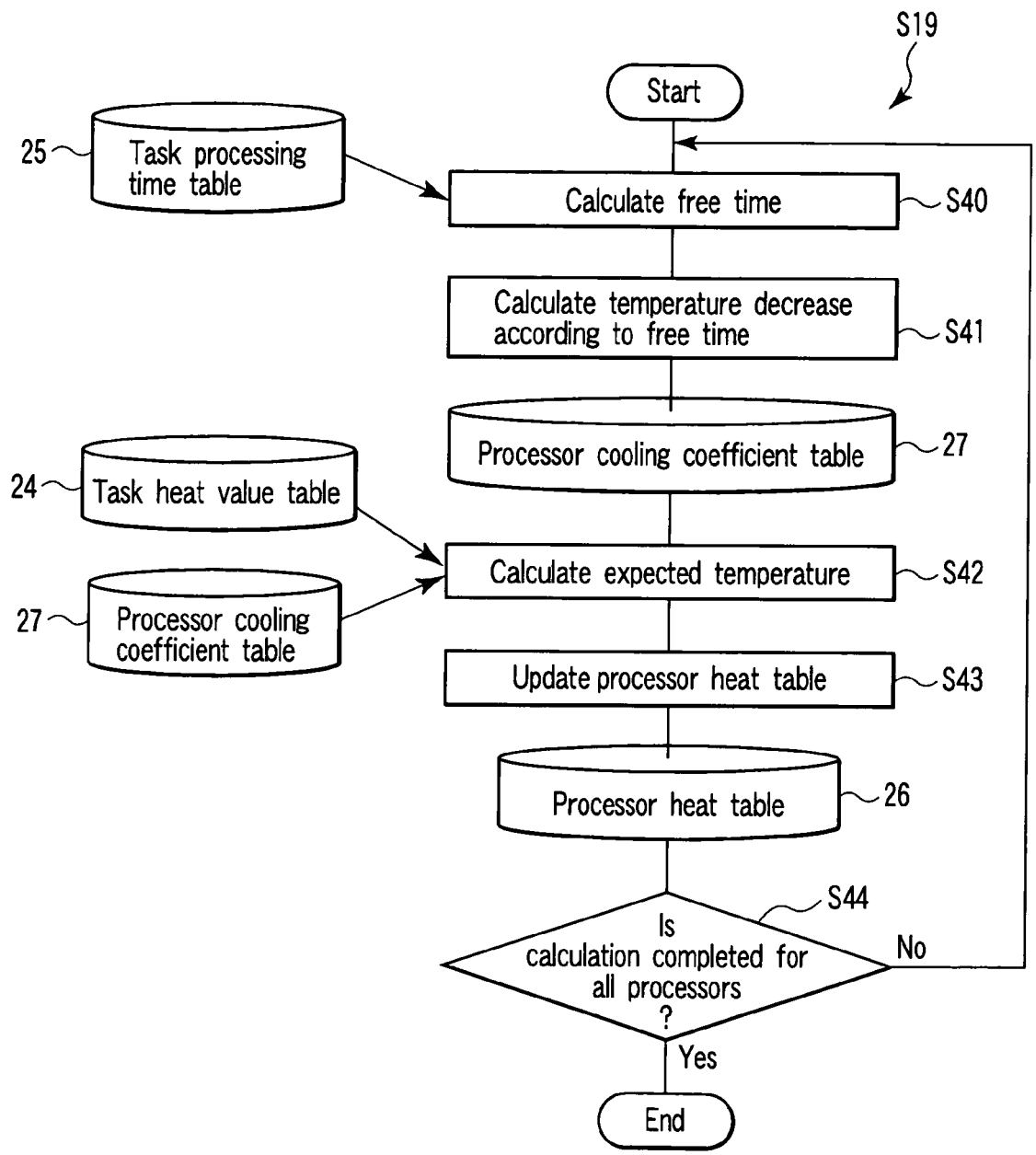
FIG. 10 is a flow chart of a process for creating a processor heat table by calculating expected temperatures in the control method of the processor system according to the first embodiment of the invention.

Next, the processor 11-*m* calculates temperatures (expected temperatures) to which the processors 11-1 to 11-(*m*–1) would rise when the processors execute the dispatched tasks TASK-1 to TASK-(m–1) (step S19). Step S19 is described referring to FIG. 10. FIG. 10 is a flow chart that illustrates a method of calculating expected temperatures, and shows the details of step S19.

Figures 11, 12:
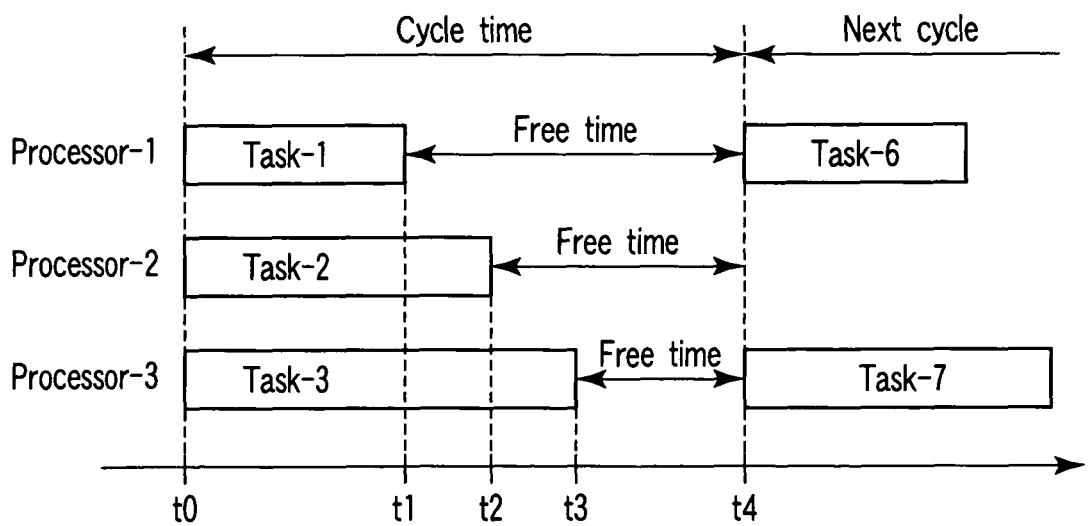
FIG. 11 is a conceptual diagram of a task processing time table that is stored in the main memory of the processor system according to the first embodiment of the invention.
FIG. 12 is a time chart that illustrates the state of the multi-core processor that is included in the processor system according to the first embodiment of the invention.

The processor 11-*m* calculates a free time (idle time) on the basis of the task processing time table 25 that is read out of the main memory 20 (step S40). An example of the task processing time table is described referring to FIG. 11. FIG. 11 is a conceptual diagram of the task processing time table. As shown in FIG. 11, the task processing time table 25 contains information relating to the tasks TASK-1 to TASK-n and times p1 to pn that are necessary for executing these tasks. Since the time necessary for executing each task can be understood from the task processing time table 25, the free time can be calculated by subtracting the processing time from the cycle time. The free time is described referring to FIG. 12. FIG. 12 is a time chart that illustrates the states of the processors, which vary with the passing of time.

As is shown in FIG. 12, assume that the processor 11-1, for instance, has executed the task TASK-1 with a predetermined cycle time. The time instant of the start of execution is t0, a time p1 is consumed by the execution of the task TASK-1, and the time instant of the end of execution is t1. The processor 11-1 is in an idle state between the time instant t1 and the end time t4 of the cycle. The time in which no processing is executed is referred to as "free time". The "cycle" in this context is a unit time duration for processing by each processor. The scheduling or task dispatch is executed on a cycle-by-cycle basis.

Figures 13, 14:
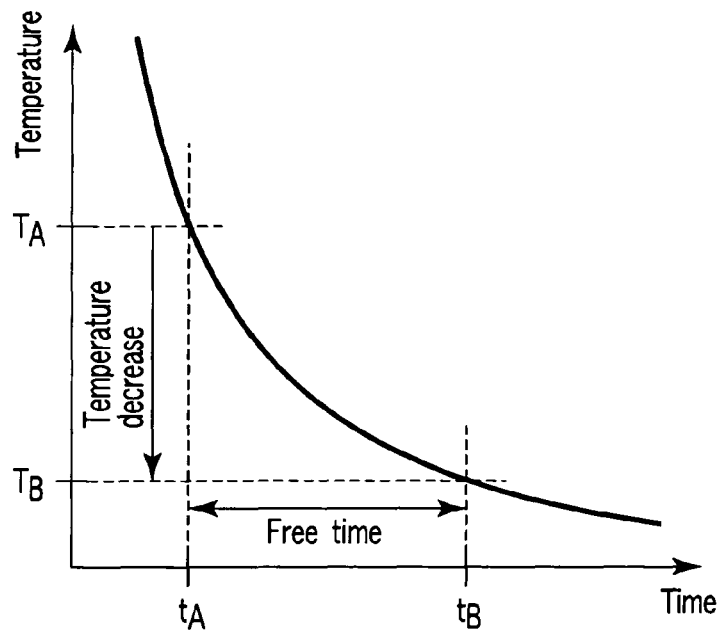
FIG. 13 is a graph that shows a relationship between a free time and a temperature decrease of the processor in the multi-core processor of the processor system according to the first embodiment of the invention.
FIG. 14 is a conceptual diagram of a processor cooling coefficient table that is stored in the main memory of the processor system according to the first embodiment of the invention.

Based on the calculated free time, the processor 11-*m* calculates a temperature decrease of each processor, 11-1 to 11-(*m*–1) (step S41). The "temperature decrease" is described referring to FIG. 13. FIG. 13 is a graph that shows the relationship between the elapsed time and the temperature variation in a case where the processor, 11-1 to 11-(*m*–1), executes no task. As shown in FIG. 13, assume that a time period between time instant $t_A$ to time instant $t_B$ is a free time. During this time period, the processor executes no processing and no heat is produced. The temperature of the processor decreases from temperature $T_A$ to temperature $T_B$. This range of decrease in temperature is referred to as "temperature decrease". The temperature decease of each processor can be calculated on the basis of the relationship shown in FIG. 13 and the current temperature of the processor.

As a result, a processor cooling coefficient table 27, as shown in FIG. 14, is created. FIG. 14 is a conceptual diagram of an example of the processor cooling coefficient table 27. As shown in FIG. 14, the decrease in temperature, Td1 to Td(m–1), of each processor, 11-1 to 11-(*m*–1), can be understood from the task to be processed and the current temperature. In fact, there is no need to calculate the temperature decrease. The reason is that the cycle time and the task processing time are understood in advance and the relationship shown in FIG. 13 is also understood from characteristics of semiconductor chips, and hence the processor cooling coefficient table as shown in FIG. 14 can be created in the main memory 20 from the beginning. Therefore, the processor 11-$m$ can recognize the temperature decrease, Td1 to Td(m−1), of each processor, 11-1 to 11-($m$−1), by referring to the processor cooling coefficient table 27 that is read out of the main memory 20.

Next, the processor 11-$m$ actually calculates expected temperatures (step S42). The expected temperature is computed using the processor cooling coefficient table 27, task heat value table 24 and current temperature. An example of the task heat value table 24 is described with reference to FIG. 15. FIG. 15 is a conceptual diagram of the task heat value table 24.

As is shown in FIG. 15, the task heat value table 24 indicates temperatures Ti1 to Tin, by which the temperatures of the processors rise when they execute tasks TASK-1 to TASK-n. Referring to the task heat value table 24, it becomes possible to understand how much the temperature of each processor rises when executing the associated task.

The processor 11-$m$ adds the temperature increase, Ti1 to Ti(m−1), which occurs when the task, TASK-1 to TASK-(m−1), is executed, to the current temperature, Tm1 to Tm(m−1). Further, the processor 11-$m$ subtracts the temperature decrease, Td1 to Td(m−1), from the added result. As a result, the expected temperature, Theat1 to Theat(m−1), to which each processor, 11-1 to 11-($m$−1), would rise after executing the task, TASK-1 to TASK-(m−1), is obtained.

Upon completing the calculation of the expected temperatures Theat1 to Theat(m−1), the processor 11-$m$ updates the processor heat table 26 (step S43). An example of the processor heat table 26 is described with reference to FIG. 16. FIG. 16 is a conceptual view of the processor heat table 26. As shown in FIG. 16, the processor heat table 26 contains expected temperatures Theat1 to Theat(m−1), to which the processors 11-1 to 11-($m$−1) would rise after executing the tasks that are dispatched in step S18.

The above-described steps S40 to S43 are executed for each of the processors 11-1 to 11-($m$−1) (step S44).

Subsequent to step S20, the processor 11-$m$ compares the expected temperature, Theat1 to Theat(m−1), of each processor, 11-1 to 11-($m$−1), with the caution temperature that is obtained referring to the temperature data table 29 (step S21). If the expected temperatures of all the processors 11-1 to 11-($m$−1) are lower than the caution temperatures, the processor 11-$m$ determines that the tasks are normally executable, and starts execution of the tasks by the processors 11-1 to 11-($m$−1).

Figure 17:
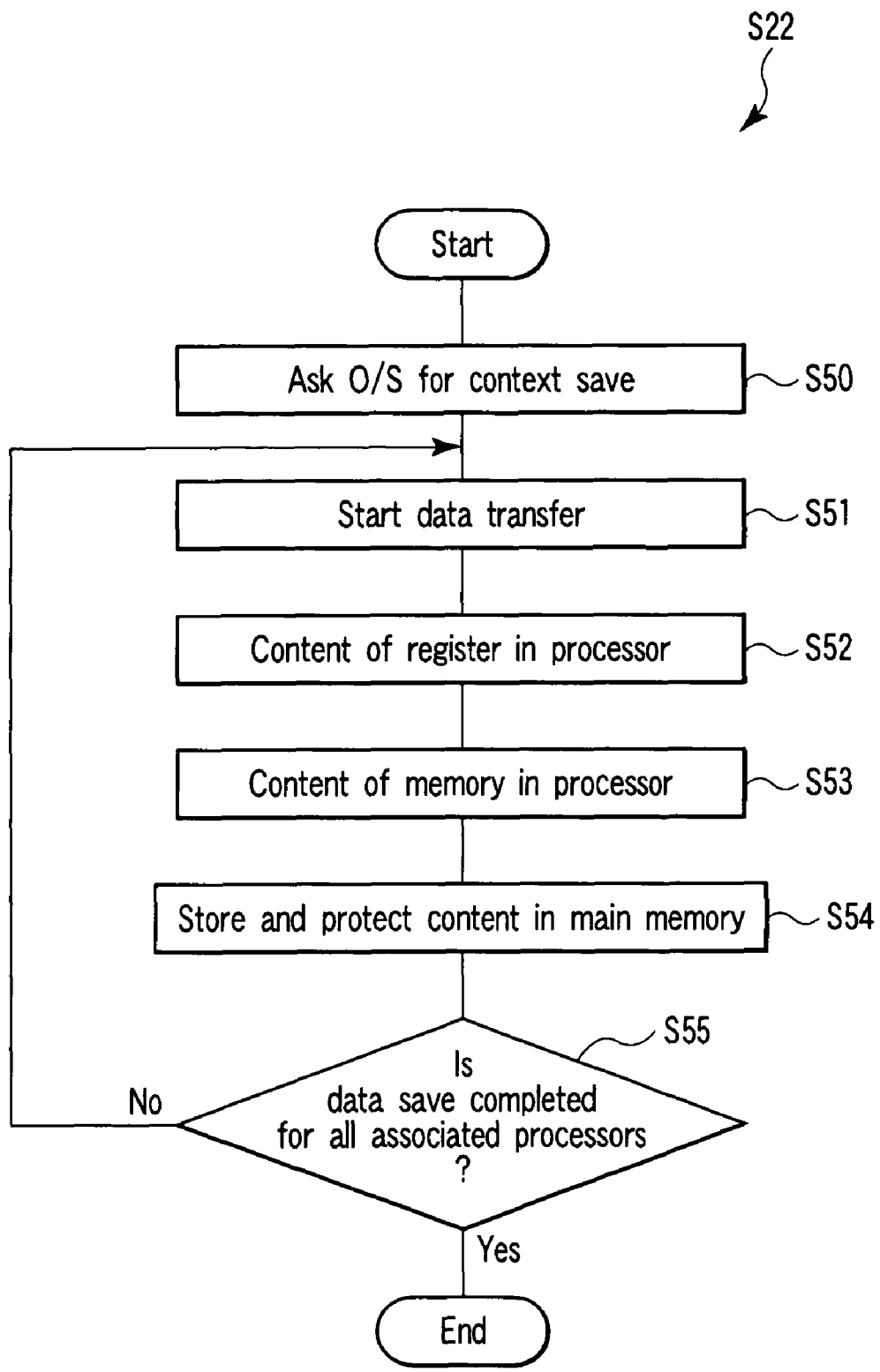
FIG. 17 is a flow chart that illustrates a process for data saving in the control method of the processor system according to the first embodiment of the present invention.

On the other hand, if there is a processor whose expected temperature is higher than the caution temperature, the processor 11-$m$ saves the data associated with this processor (step S22). Step S22 is described referring to FIG. 17. FIG. 17 is a flow chart that illustrates the data save method. FIG. 17 shows the details of step S22.

Figure 18:
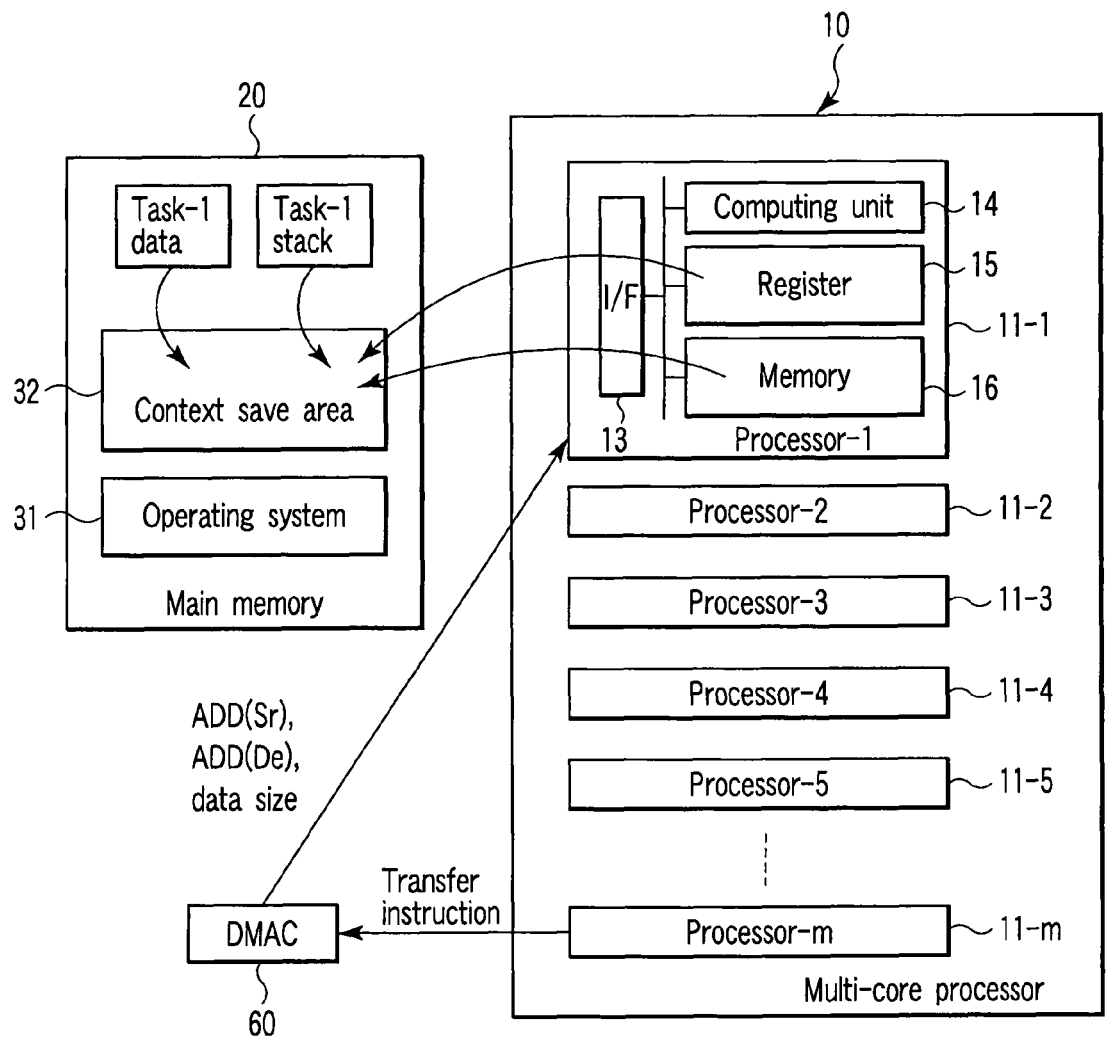
FIG. 18 is a block diagram of the processor system according to the first embodiment of the invention, FIG. 18 illustrating a scheme of saving data from the processor into the main memory.

To start with, the processor 11-$m$ asks the operating system to execute context save. The context save means that the state of the processor is saved as such. A data transfer instruction is issued to the DMA controller 60, and data transfer is started (step S51). Referring to FIG. 18, the context save is described by taking, as an example, a case where the expected temperature of the processor 11-1 is higher than the caution temperature. FIG. 18 is a block diagram that shows the multi-core processor 10, main memory 20 and DMA controller 60 when data save is executed for the processor 11-1.

As is shown in FIG. 18, the DMA controller 60 transfers by DMA the programs and data, which are stored in the register 15 and memory 16 in the processor 11-1, to the context save area 32 in the main memory 20 (step S52, S53). At the same time, if there are task data or a task stack in the main memory 20, which are used by the processor 11-1, these are also transferred to the context save area 32. Thereby, the current state of the processor 11-1 is saved in the main memory 20 and protected (step S54). The data, etc. that are saved in the context save area 32 are used for re-dispatch of tasks. Re-dispatch will be described later.

The process of steps S51 to S54 is executed for all the processors that require data save (step S55), and the use of these processors is stopped ("non-usable") (step S23). The above-described data save method is the same as in step S14.

<Re-Scheduling>

If the task that is dispatched to the processor, whose expected temperature is not less than the caution temperature in step S21, has a high position in the priority order (step S24), re-scheduling is executed prior to starting the already dispatched tasks (step S25). Re-scheduling is executed after the processor 11-$m$ receives a context save completion notice from the operating system.

For example, the processor 11-1, which has been described referring to FIG. 18, is assigned the task TASK-1 with the highest position in the priority order. The processor 11-$m$ searches for a processor, other than the processor 11-1, to which the task TASK-1 can be dispatched. If there is such a processor, the processor 11-$m$ determines that task TASK-1 is to be newly dispatched to the processor. Basically, re-scheduling may be executed such that the task TASK-1 is dispatched to an idle processor whose temperature is lower than the danger temperature. If there are a plurality of idle processors, the task TASK-1 may be dispatched to the idle processor with a lowest temperature. In the case where the processor with a lowest temperature is already assigned a task, the task may be saved and the task TASK-1 may newly be dispatched. In this way, the re-scheduling is executed. After the re-scheduling is executed, the dispatch table is updated (step S17).

FIG. 19 is a conceptual diagram of the dispatch table that is updated after re-scheduling. Since the processor 11-1 (Processor-1) is set in the non-usable state, no task is dispatched thereto. Any one of the other processors is re-assigned a task that is different from the previous dispatched task.

Figure 20:
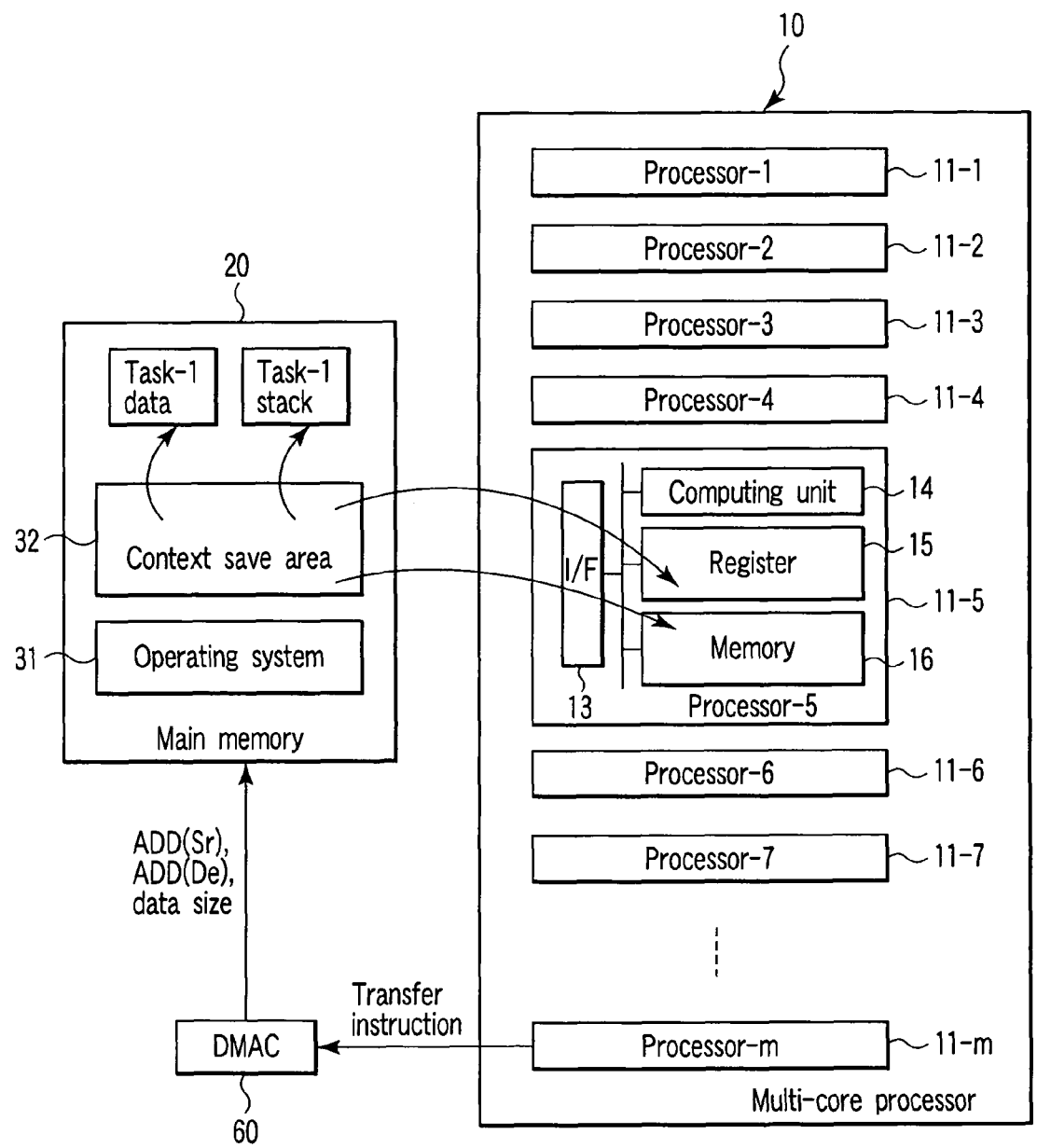
FIG. 20 is a block diagram of the processor system according to the first embodiment of the invention, FIG. 20 illustrating a scheme of DMA transfer of data from the main memory to the processor at a time of re-dispatching tasks.

Assume that re-dispatch of the task TASK-1 to the processor 11-5 is determined. Then, the processor 11-$m$ executes task dispatch as described in connection with step S18. In this case, the data and programs associated with the task TASK-1 are transferred from the context save area 32 to the processor 11-5. FIG. 20 illustrates this process. FIG. 20 is a block diagram that shows the multi-core processor 10, main memory 20 and DMA controller 60 when the task TASK-1 is dispatched to the processor 11-5.

As is shown in FIG. 20, in accordance with a transfer instruction from the processor 11-$m$, the data and programs are transferred from the context save area 32 of the main memory 20 to the register 15 and memory 16 of the processor 11-5. As a result, the state of the processor 11-1 immediately before the data save is restored in the processor 11-5.

<Execution of Task>

Tasks are executed after it is determined in step S21 that the estimated temperature<the caution temperature with respect to all the processors, or after it is determined in step S21 that the estimated temperature>the caution temperature and re-scheduling is executed (step S26). Even if the re-scheduling is executed in step S25, there may be a case where the high-priority task cannot be dispatched. In such a case, control goes to step S26 in the state in which the task is saved in the context save area 32.

A description is given of a case where only the processor 11-1 is set in the non-usable state in step S23. The processor 11-$m$ periodically monitors the temperatures of the processors 11-2 to 11-($m$−1) that are executing the tasks (step S27). In the case where a real-time application in which processing is repeated with a specified cycle is being executed, the temperatures are monitored at intervals of the cycle. The current temperatures of the processors 11-2 to 11-($m$−1), which are obtained by the temperature sensors 12-2 to 12-($m$−1), are compared with the danger temperatures that are obtained from the temperature data table 29 (step S28).

If the current temperatures are lower than the danger temperatures, the processors 11-2 to 11-($m$−1) continue execution of the tasks (step S29). However, there may be a case where the current temperature of the processor reaches the danger temperature due to sudden change in ambient temperature, non-uniformity in characteristics of processors, or an unexpected excessive load. In such a case, the processor 11-$m$ executes data save for the processor (step S31) and stops the operation of the processor. The data saving method is the same as described in connection with step S22. The operation of the processor, which is once stopped, is not resumed in the same cycle.

If the current temperatures of the other processors do not rise to the danger temperatures and the present cycle is completed with no problem (step S30), the processor 11-$m$ updates the processor heat table 26 (step S33). In step S33, the processor 11-$m$ executes subtraction of the expected heat information in the processor heat table 26. Thus, the data in the processor heat table is changed to the current temperatures.

Thereafter, steps S25 to S33 are repeated until the process for all the tasks is completed (step S34).

As has been described above, according to the processor system and the control method thereof according to the first embodiment of the present invention, the following advantageous effects (1) to (3) can be obtained.

(1) The Operational Performance of the Processor System can be Improved (Part 1).

Normally, in the multi-core processor having a plurality of processors, the temperatures of the individual processors vary due to leak current of each processor, non-uniformity in heat radiation resistance, physical arrangement of processors and a difference in executed processes. In the present embodiment, tasks are assigned to the processors on the basis of the priority order of tasks and the processor temperatures. For example, the task with the highest priority number is dispatched to the operable processor with the lowest temperature. For example, where there is a real-time application, the real-time application is set at a high priority task. Thereby, this task is dispatched to the processor with priority, and no problem arises in the operation of the real-time application. FIG. 21 illustrates the operation of the real-time application. In FIG. 21, tasks TASK-1, TASK-10 and TASK-20 are real-time applications. In the case where a real-time application is a task such as a video application or an audio application, which completes a process with a predetermined cycle time and repeats the process with a predetermined cycle, this task is periodically dispatched to the processor.

As has been described above, the task with a high priority number is dispatched with priority to the processor. In other words, scheduling is executed such that the task with a high priority number is preferentially executed, compared to the other tasks. Thus, suspension in the execution of the task with high priority can effectively be prevented. As a result, it becomes possible to prevent a serious problem in the system using the processors, and to improve the operational performance of the processor system.

(2) The Operational Performance of the Processor System can be Improved (Part 2).

In the structure according to the present embodiment, expected temperatures, to which the processors would rise after executing tasks, are calculated prior to executing the tasks. Based on the calculation results, the processor heat table is created. Task dispatch is executed so that the expected temperature may not reach the caution temperature. Thus, the possibility is low that the temperature of the processor, which has actually executed the task, exceeds the caution temperature. However, if the temperature reaches the danger temperature due to the influence of the environment, the task that is executed by the processor is saved in the context save area 32 in the main memory 20. Therefore, even if the operation of a processor is stopped before completing the task, this task is dispatched to a proper processor with priority in the next cycle and the task is resumed from the state at the time of stop of the operation.

Figure 22:
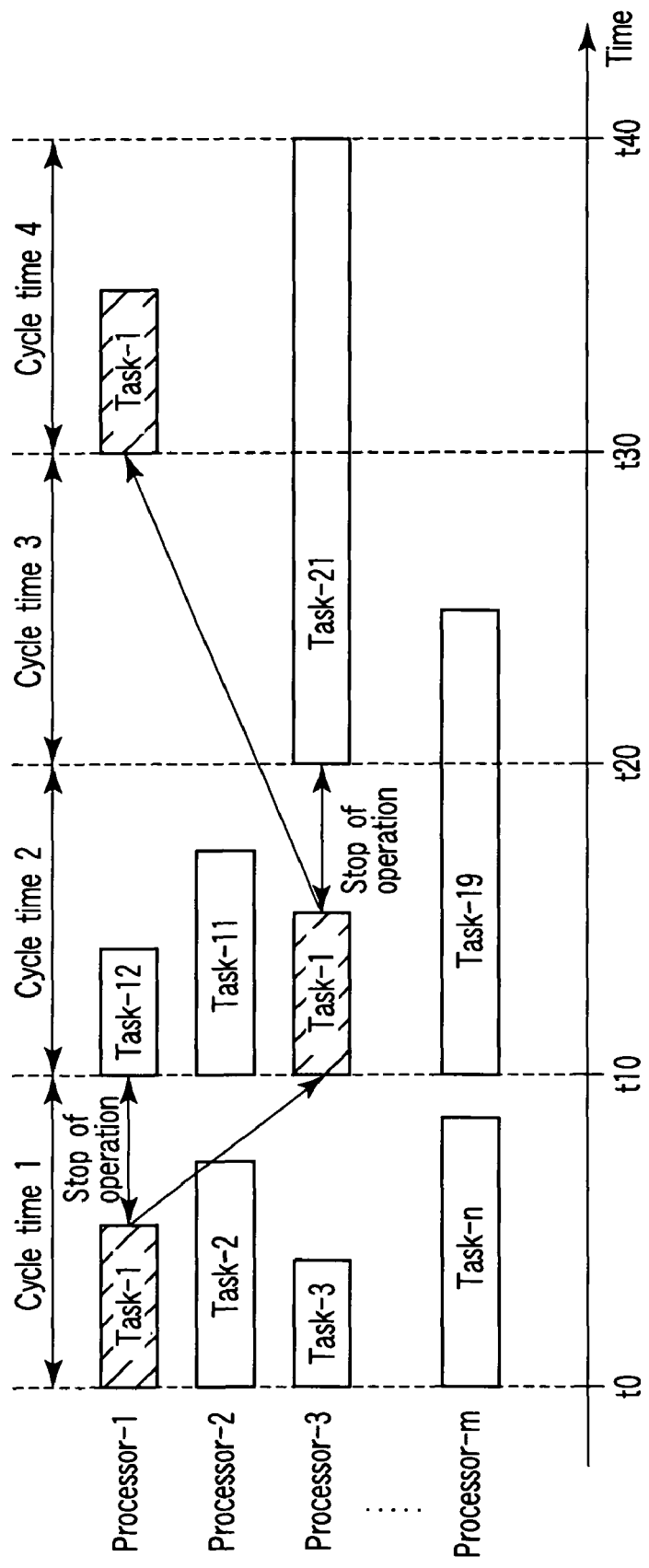
FIG. 22 is a time chart that illustrates the state of the multi-core processor that is included in the processor system according to the first embodiment of the invention.

FIG. 22 illustrates this scheme. As shown in FIG. 22, assume that the task TASK-1, which is executed by the processor 11-1 in cycle time 1, is suspended. In the next cycle time 2, the suspended task TASK-1 is re-dispatched to the processor 11-3 and the process is resumed from the stage at which the processor 11-1 suspended the task TASK-1. If the task TASK-1 that is executed by the processor-11-3 is also suspended and there is no available processor in cycle time 3, the task TASK-1 is dispatched to the processor 11-1 in the next cycle time 4.

In this manner, even if the processing of the task is suspended, the task is preferentially dispatched to a proper processor in a subsequent cycle time and the processing of the suspended task is resumed. Thus, a fault in the system using the processors can be prevented. Therefore, the operational performance of the processor system can be improved.

(3) A Temperature Increase in the Processor System can be Suppressed.

According to the processor system of the present embodiment, the operation of the processor, the temperature of which has reached the danger temperature, is stopped. Therefore, a temperature rise in the entire processor system can be suppressed.

As has been described above in connection with the advantageous effect (2), even if the operation of any one of the processors is stopped while it is executing the task, the state of the processor (including data that is being subjected to arithmetic operations) is saved in the main memory by context save. Therefore, a decrease in operational performance can be suppressed.

In the above-described embodiment, the dispatch table 23 is entirely rewritten in step S17, as shown in FIG. 19. Alternatively, the earlier version of the dispatch table may be stored. In this case, as regards tasks that are not re-dispatched by the re-scheduling, a process for dispatching these tasks may be omitted.

Figure 23:
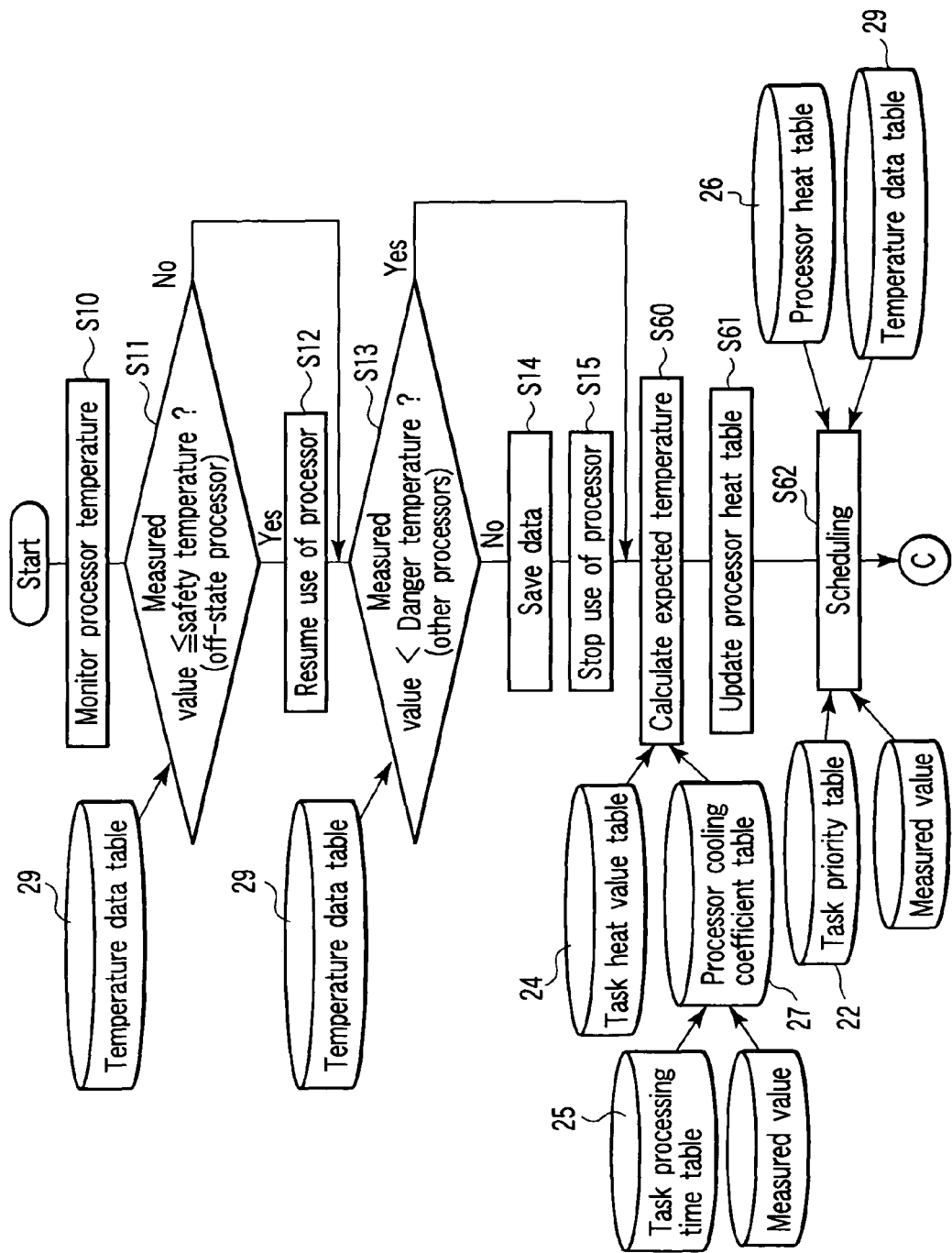
FIG. 23 and FIG. 24 are flow charts illustrating a control method of a processor system according to a second embodiment of the invention.
Figure 24:
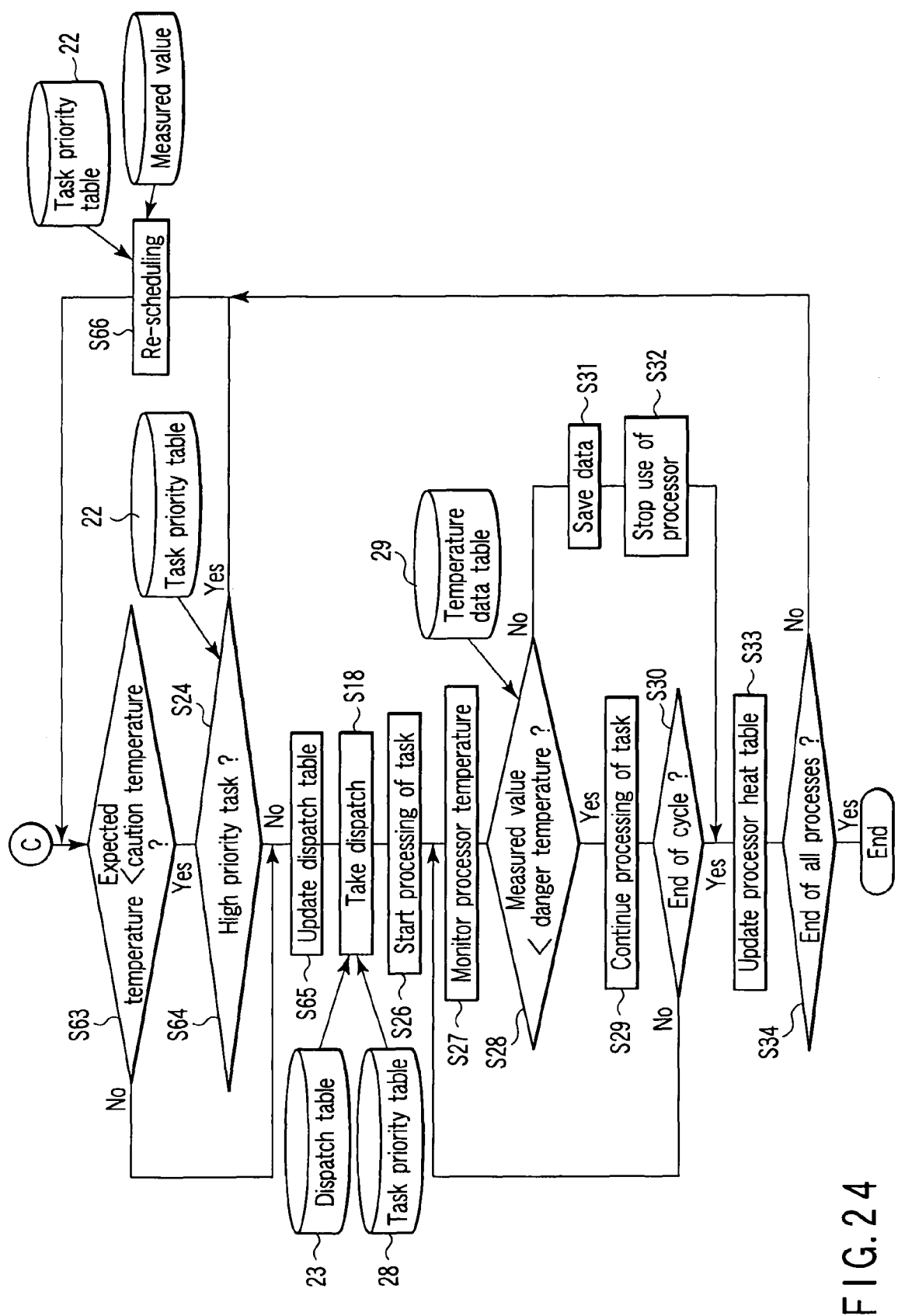

Next, a processor system and a control method thereof according to a second embodiment of the present invention are described. The second embodiment differs from the first embodiment in that the expected temperatures are calculated prior to task dispatch. The configuration of the processor system is the same as that in the first embodiment, and a description thereof is omitted. The operation of the processor system is described referring to flow charts of FIG. 23 and FIG. 24. A description of the parts common to those of the first embodiment is omitted.

To start with, the process of steps S10 to S15, which has been described in connection with the first embodiment, is executed to complete the initialization. After completion of the initialization, expected temperatures are first calculated (step S60). The calculation method of expected temperatures in step S60 is basically the same as that in step S19 in the first embodiment. In the present embodiment, expected temperatures are calculated as regards the case where each processor executes for a plurality of tasks. For this purpose, the expected temperatures are calculated using the task value heat table 24, which has been described referring to FIG. 15, and a processor cooling coefficient table 27 shown in FIG. 25. The processor cooling coefficient table 27 used in this second embodiment differs from that in the first embodiment in that the table 27 contains the temperature decrease of each processor, 11-1 to 11-($m$−1), in the case where the processor has executed for all the tasks TASK-1 to TASK-n. The method of calculating the temperature decrease in the case where each processor executes for tasks TASK-1 to TASK-n is the same as the calculation method in the first embodiment. Specifically, in the present embodiment, the temperature decrease is calculated with respect to all combinations of the processors 11-1 to 11-($m$−1) and the tasks TASK-1 to TASK-n, and the processor cooling coefficient table 27 as shown in FIG. 25 is created.

Using the processor cooling coefficient table 27 shown in FIG. 25, the processor 11-$m$ calculates expected temperatures of the processors 11-1 to 11-($m$−1). The calculation method is the same as in the first embodiment. However, like the processor cooling coefficient table 27, the expected temperatures are calculated with respect to all combinations of the processors 11-1 to 11-($m$−1) and the tasks TASK-1 to TASK-n. As a result, a processor heat table 26, as shown in FIG. 26, is created (step S61). Specifically, by referring to the processor heat table 26, it becomes possible to recognize expected temperatures Theat11 to Theat1$n$ in a case where the processor 11-1 executes tasks TASK-1 to TASK-n, expected temperatures Theat21 to Theat2$n$ in a case where the processor 11-2 executes tasks TASK-1 to TASK-n, expected temperatures Theat31 to Theat3$n$ in a case where the processor 11-3 executes tasks TASK-1 to TASK-n, . . . , and expected temperatures Theat(m−1)1 to Theat(m−1)n in a case where the processor 11-($m$−1) executes tasks TASK-1 to TASK-n.

After updating the processor heat table 26, the processor 11-$m$ executes scheduling (step S62). The scheduling is executed using the priority of each task that is obtained from the task priority table 22, the current temperatures of the processors 11-1 to 11-($m$−1), the expected temperatures of the processors 11-1 to 11-($m$−1) that are obtained from the processor heat table 26, and the caution temperatures that are obtained from the temperature data table 29. Basically, like the first embodiment, the scheduling is executed such that the task with a highest position in the priority order is assigned to the processor with a lowest temperature. In the process of scheduling, the expected temperatures are compared with the caution temperatures (step S63). If the expected temperature exceeds the caution temperature with respect to the task with high priority (step S64), re-scheduling is executed (step S66). At this stage, the tasks are not actually dispatched to the processors. Thus, there is no need to stop the operation of the processor whose expected temperature exceeds the caution temperature. The processor 11-$m$ efficiently executes scheduling in consideration of the priority order of tasks and the current temperatures so as to decrease a non-operable processor.

Upon completion of the scheduling, the processor 11-$m$ updates the dispatch table 23 (step S65). Based on the dispatch table 23, the processor 11-$m$ dispatches tasks to the processors 11-1 to 11-($m$−1).

Subsequently, like the first embodiment, the process beginning with step S26 is executed.

According to the processor system and the control method of the present embodiment, the following advantageous effect (4) can be obtained in addition to the advantageous effects (1) to (3) that have been described in connection with the first embodiment.

(4) The Operational Performance of the Processor System can be Improved (Part 3).

In the structure and method according to the present embodiment, expected temperatures of processors, to which the temperatures of the processors would rise when each processor executes a respective tasks, are calculated prior to dispatching the tasks to the processors. Thus, the processor (or system controller) that executes task dispatch can recognize expected temperatures in connection with all combinations of the processors and tasks. Therefore, efficient task dispatch to the processors can be executed in consideration of the priority order of tasks, and the process performance of the processor system can be improved.

Figure 27:
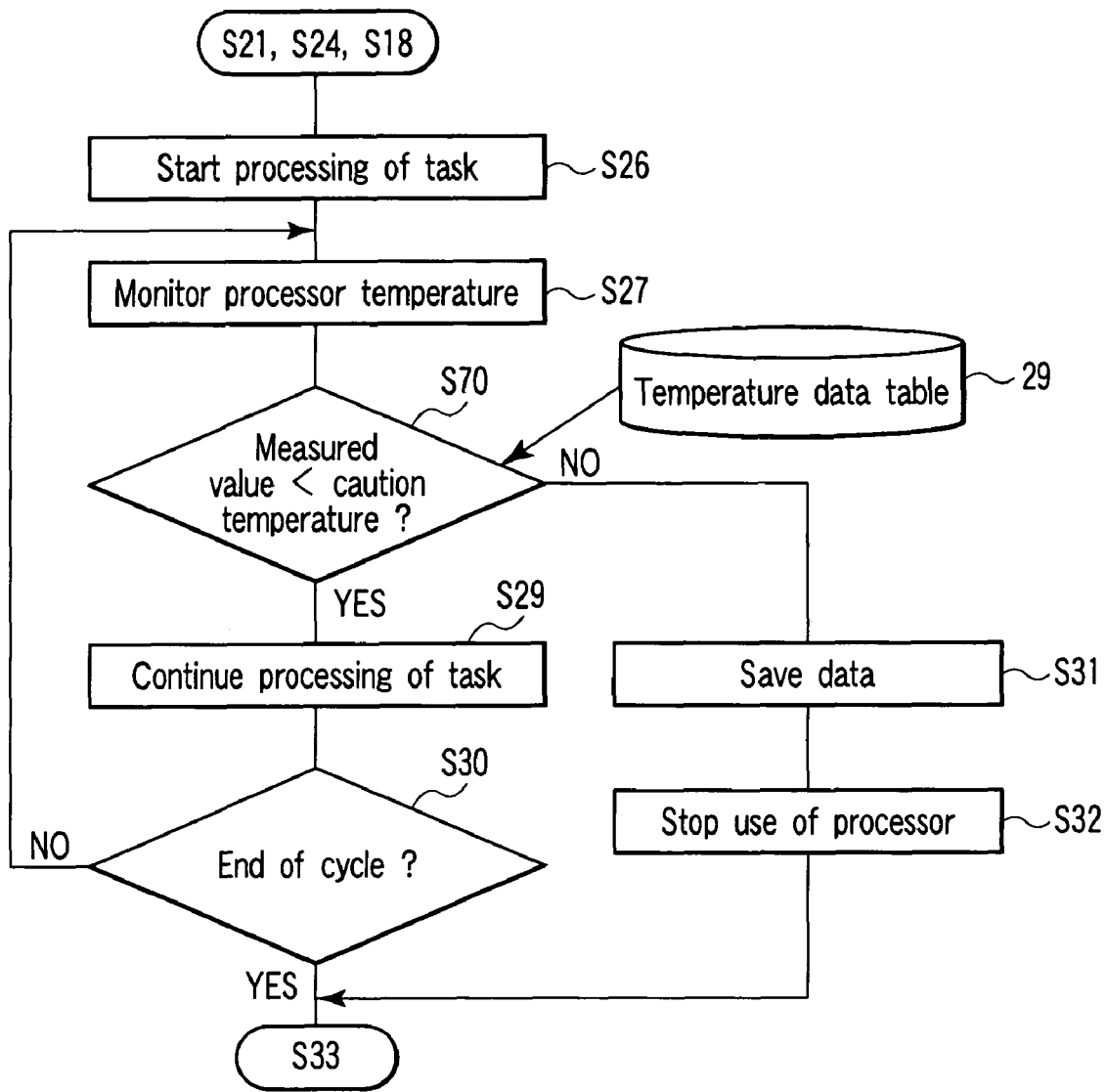
FIG. 27 is a flow chart that illustrates a process during execution of tasks in a control method of a processor system according to a third embodiment of the present invention.

Next, a processor system and a control method thereof according to a third embodiment of the present invention will be described. The third embodiment relates to a method of further suppressing a temperature increase in the multi-core processor in the first and second embodiments. The structure of the processor system is the same as that in the first embodiment, so a description thereof is omitted. The operation of the processor system according to the third embodiment is described referring to FIG. 27. FIG. 27 is a flow chart that illustrates a part of the operation of the processor system of the third embodiment.

The processors 11-1 to 11-($m$−1) start execution of the tasks after step S21 or S24 in the first embodiment or after step S18 in the second embodiment (step S26). The processor 11-$m$ periodically monitors the temperatures of the processors 11-1 to 11-($m$−1) that execute the tasks (step S27). In the first and second embodiments, the current temperature is compared with the danger temperature in step S28. In the present third embodiment, the current temperature is compared with the caution temperature in step S70. If the current temperature is lower than the caution temperature, the processor is made to continue execution of the task (step S29). If the current temperature is the caution temperature or higher, the data is saved and the operation of the processor is stopped (step S32).

The subsequent process is the same as in the first and second embodiments.

According to the method of the third embodiment, the following advantageous effect (5) can be obtained in addition to the advantageous effects (1) to (4) that have been described in connection with the first and second embodiments.

(5) The Temperature Increase of the Multi-Core Processor can Effectively be Suppressed.

Figure 28:
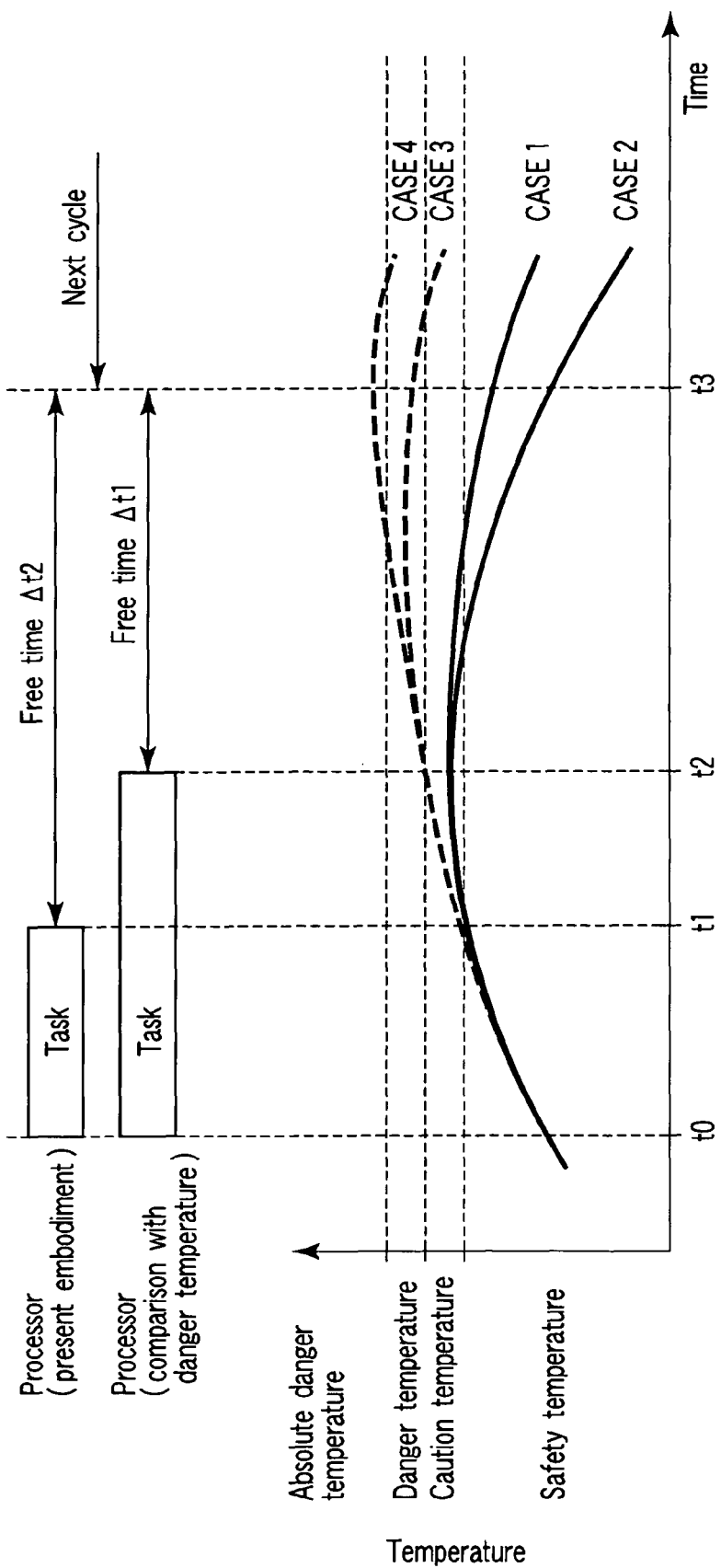
FIG. 28 is a time chart that illustrates the state of the multi-core processor that is included in the processor system according to the third embodiment of the invention.

This advantageous effect is described referring to FIG. 28. FIG. 28 is a graph that shows the state of the processor and the temperature of the processor with the passing of time. The task begins at time instant t0. The cycle time is between time instant t0 and time instant t3. In the example of FIG. 28, the processor temperature becomes higher than the danger temperature.

In the case where the processor temperature is compared with the danger temperature while the processor is executing the task, the operation of the processor is stopped at time instant t2, as shown in FIG. 28. A time period Δt1 between time instant t2 and time instant t3 is a free time. In the free time, the temperature of the processor lowers. Even if an operation halt instruction is issued to the processor, however, the operation of the processor cannot be stopped at the same time as the issuance of the halt instruction. There is a predetermined time lag between the issuance of the halt instruction and the actual stop of the operation. Consequently, the temperature of the processor does not immediately begin to lower at time instant t2. After the lapse of a predetermined time period, the temperature of the processor begins to lower. As indicated by CASE 3 in FIG. 28, the temperature of the processor does not sufficiently lower during the free time Δt1, and the temperature of the processor remains above the danger temperature even at time instant t3 from which the next cycle time begins. Furthermore, as indicated by CASE 4 in FIG. 28, the temperature of the processor may reach the absolute danger temperature. If the temperature of the processor reaches the absolute danger temperature, the processor may physically be made inoperable.

In the present embodiment, the temperature of the processor that is executing the task is compared with the caution temperature that is lower than the danger temperature. As shown in FIG. 28, the processor stops operating at time instant t1. Accordingly, a time period Δt2 (>Δt1) between time instant t1 and time instant t3 becomes a free time. The processor is sufficiently cooled during the free time Δt2. As indicated by CASE 2, the temperature of the processor decreases to the safety temperature. At the worst, the temperature of the processor becomes lower than the caution temperature (CASE 1).

According to the above-described method of the third embodiment, the processor can sufficiently be cooled, and thermal runaway or destruction of the processor can be prevented. Since the processor is fully cooled during the free time, the task can be dispatched in the next cycle time. Therefore, the processing efficiency of the processor system can be improved.

Next, a processor system and a control method thereof according to a fourth embodiment of the present invention will be described. The fourth embodiment relates to a method of improving the calculation precision of expected temperatures in the first to third embodiments.

Figure 29:
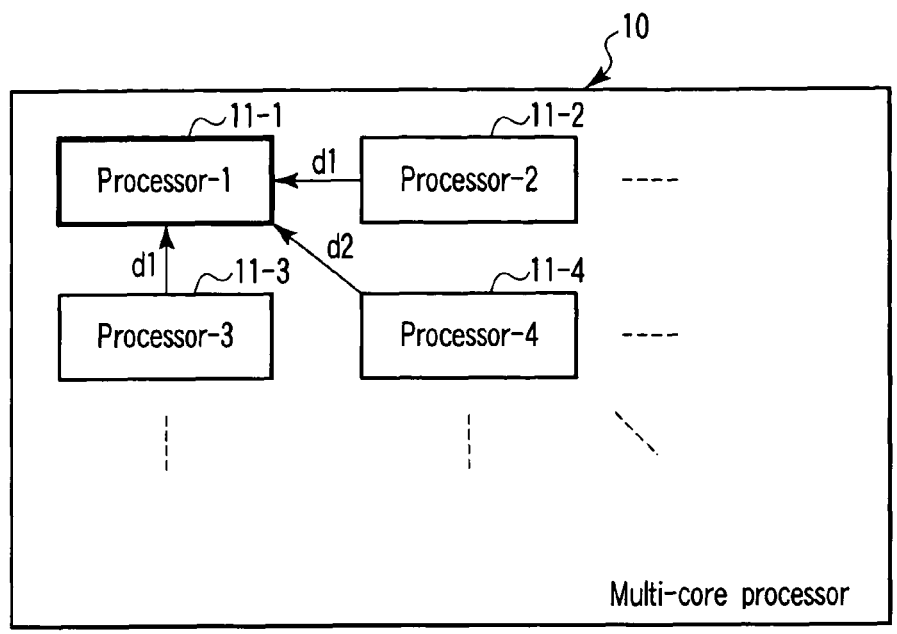
FIG. 29 is a block diagram of a multi-core processor that is included in a processor system according to a fourth embodiment of the invention.

FIG. 29 is a block diagram of the multi-core processor 10. The processors 11-1 to 11-$m$ are mutually affected by heat propagation from adjacent ones, leading to an increase in temperature. For example, in the case of the arrangement shown in FIG. 29, the processor 11-1 is seriously affected by heat propagation from the processors 11-2 and 11-3 that are located at a least distance (d1) from the processor 11-1. The processor 11-1 is also affected to some degree by heat propagation from the processor 11-4 that is located at a next least distance (d2) from the processor 11-1. In addition, the processor 11-1 is somewhat affected by heat propagation from the other processors 11-5 to 11-$m$.

Figure 30:
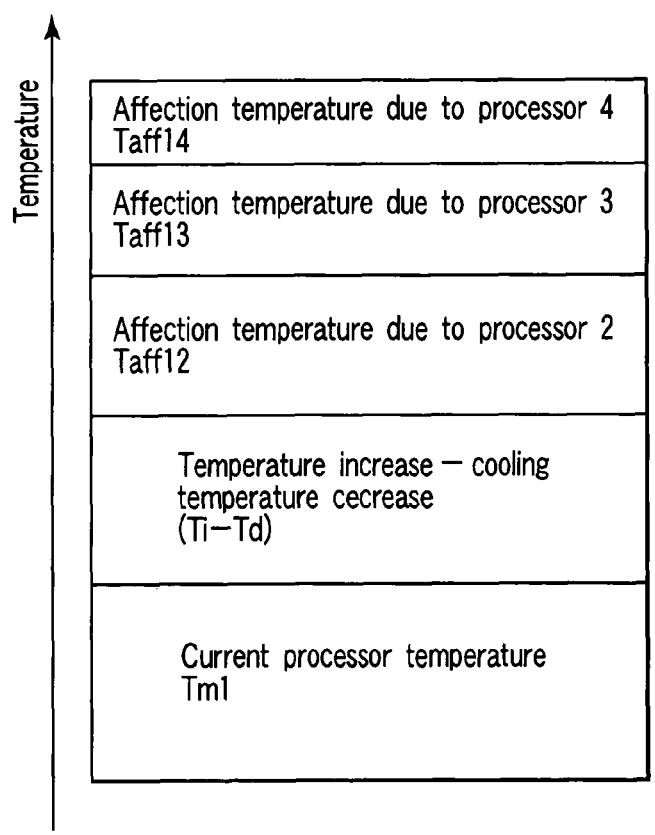
FIG. 30 is a conceptual diagram that shows the temperature of the processor in the multi-core processor that is included in the processor system according to the fourth embodiment of the invention.

In the present fourth embodiment, when the expected temperatures are calculated in step S19 or S60 in the first to third embodiments, the affection of heat propagation from the adjacent processors is taken into account. For example, if attention is paid to the processor 11-1 in FIG. 29, the expected temperature Theat is as shown in FIG. 30. If temperature increases due to heat propagation from the processors 11-2, 11-3 and 11-4 are designated by affection temperatures Taff12, Taff13 and Taff14, the following equation is given, $$Theat1 = Tm1 + (Ti - Td) + Taff12 + Taff13 + Taff14.$$

As has been described above, in order to add the affection temperatures in calculating expected temperatures, an affection temperature table is stored in the main memory 20. FIG. 31 shows an example of the affection temperature table. FIG. 31 is a conceptual view of the affection temperature table.

As is shown in FIG. 31, the affection temperature table contains, as a coefficient c, the affection of heat propagation, which the processor, 11-1 to 11-$m$, suffers from the other processors. The coefficient c is found in advance by simulation or measurement using actual machines. The affection temperature Taff is calculated by multiplying the coefficient by the current temperature of each processor. Assume now that the coefficient of the affection of heat propagation that the processor 11-1 suffers from the processor 11-2 is c12 and the current temperature of the processor 11-2 is Tm2. In this case, the affection temperature Taff12, by which the temperature of the processor 11-1 rises due to the affection of the processor 11-2, is calculated by (Tm2×c12). The processor 11-$m$ executes this calculation in step S19 or S60 or prior to step S19 or S60, and completes creation of the affection temperature table. When the expected temperature Theat is actually calculated, the affection temperature table, as well as the task heat value table and the processor cooling coefficient table, is referred to.

According to the method of this embodiment, the following advantageous effect (6) can be obtained in addition to the advantageous effects (1) to (5) that have been described in connection with the first and second embodiments.

(6) The Performance of the Processor System can be Improved (Part 4).

In the method of the present embodiment, the expected temperature Theat of the processor is calculated in consideration of the affection of the heat of other processors. Therefore, the precision of the expected temperature Theat can be enhanced. That is, an error between the expected temperature Theat and the temperature at the time of actually executing the task can be decreased. This can reduce the possibility of the case where the temperature of the processor exceeds the danger temperature (or caution temperature) when the task is executed. Hence, more efficient use of the processor is possible, and the performance of the processor system can be improved.

In the above-described embodiment, the processor 11-1 is taken as an example, and heat propagation from the processors 11-2 to 11-4 is considered. As the number of processors to be considered increases, the precision becomes higher. However, the affection of heat propagation decreases as the distance from the processor becomes greater. How many processors are to be considered should be determined by generally considering the desired precision in expected temperatures and the amount of calculations therefor.

As regards the affection temperature, the affection of feedback may be considered. For example, attention is paid to the relationship between the processor 11-1 and the processor 11-2. The temperature of the processor 11-1 rises due to heat propagation from the processor 11-2. Then, the temperature of the processor 11-2 also rises due to heat propagation from the processor 11-1 having the increased temperature. Further, the temperature of the processor 11-1 rises due to heat propagation from the processor 11-2 having the increased temperature. The affection temperature table may be created by considering the case where the processors are mutually affected in this manner and the temperatures of the processors increase. In this case, expected temperatures can be calculated with higher precision.

Next, a processor system and a control method thereof according to a fifth embodiment of the present invention will be described. In the fifth embodiment, a processor that is intentionally set in an inoperable state is provided in the multi-core processor 10. Thereby, an increase in temperature of the entire multi-core processor is suppressed.

Figure 32:
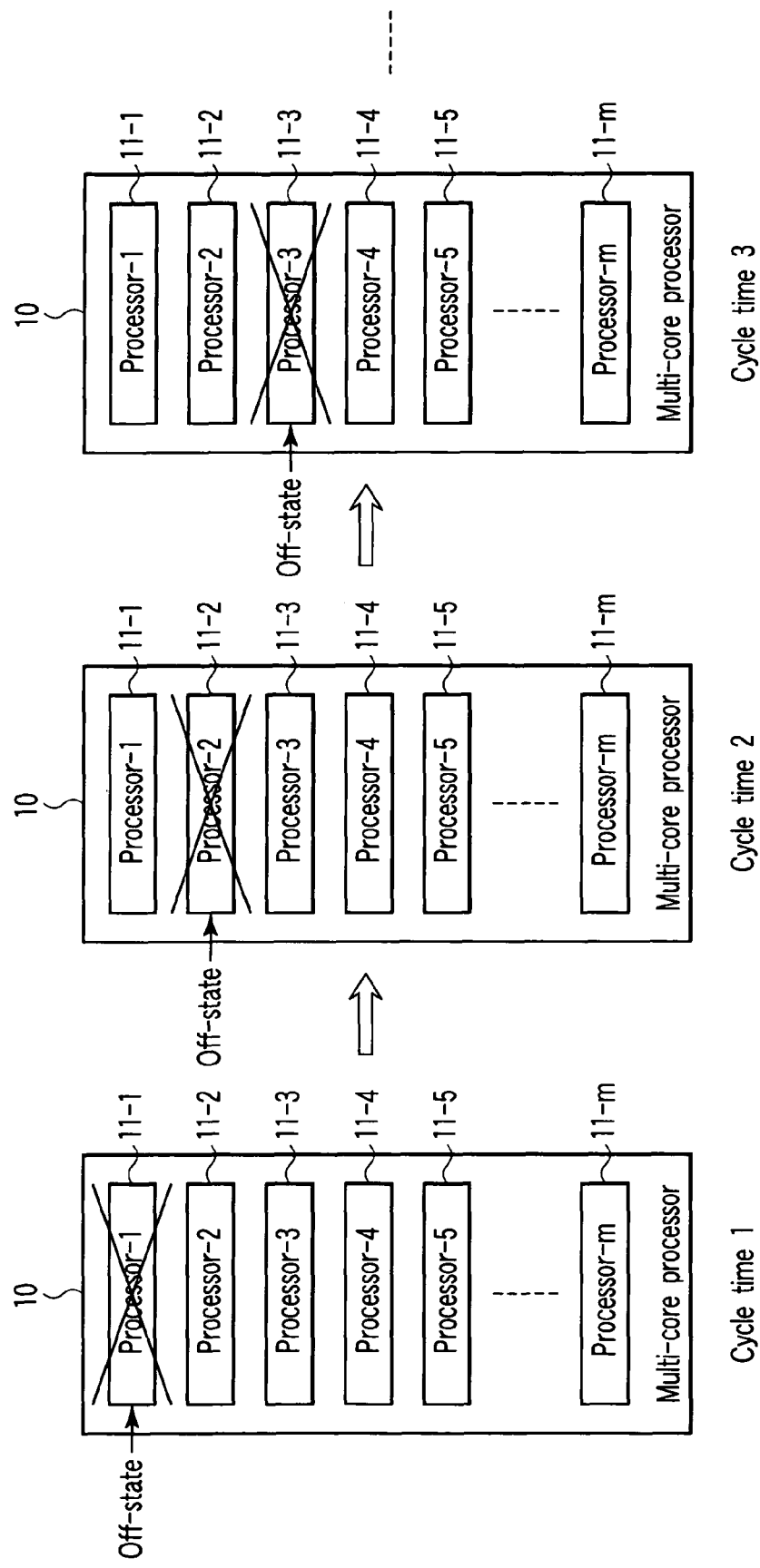
FIG. 32 is a block diagram of a multi-core processor that is included in a processor system according to a fifth embodiment of the invention, FIG. 32 illustrating a transition in operation with the passing of time.

FIG. 32 is a block diagram of the multi-core processor 10 according to the present fifth embodiment. FIG. 32 illustrates a transition of the operations of the processors with the passing of time. As is shown in FIG. 32, in the multi-core processor 10 according to the fifth embodiment, at least one of the processors is forcibly set in an inoperable state. From cycle time to cycle time, the processor that is set in the inoperable state is changed.

Figure 33:
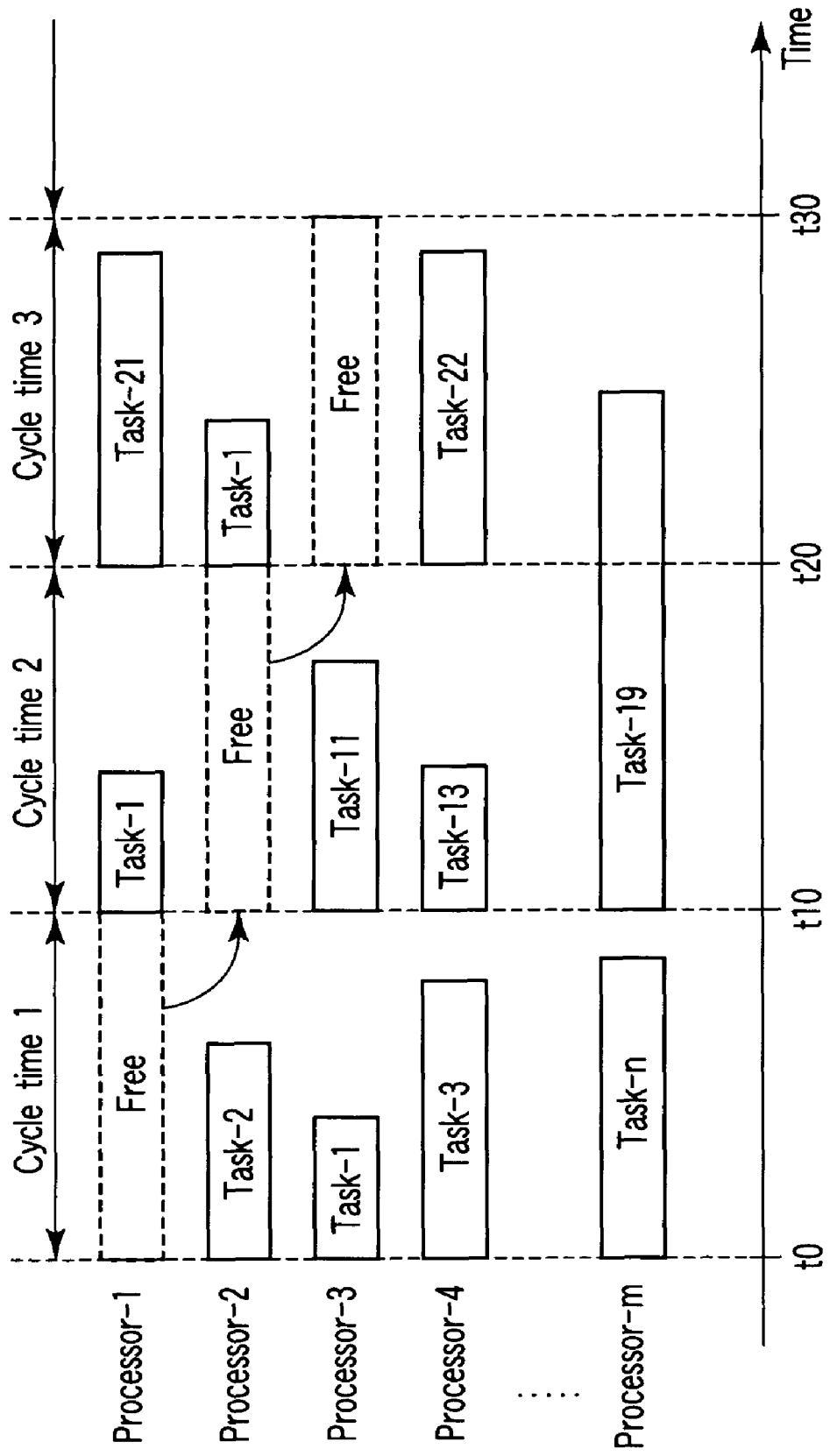
FIG. 33 is a time chart that illustrates the state of the multi-core processor that is included in the processor system according to the fifth embodiment of the invention.

FIG. 33 is a time chart that illustrates the operations of the processors 11-1 to 11-$m$. The processors that are set in the inoperable state correspond to those in FIG. 32. As is shown in FIG. 32 and FIG. 33, the processor 11-1 is set in the inoperable state in cycle time 1, the processor 11-2 is set in the inoperable state in the next cycle time 2, and the processor 11-3 is set in the inoperable state in cycle time 3. As a matter of course, the processor that is set in the inoperable state executes no processing, and the cycle time in which the processor is set in the inoperable state is the free time.

In order to successively set the processors in the inoperable state, the processor that executes task management or the system controller retains the dispatch table. No task is dispatched to a selected one of the processors within the dispatch table in a forcible manner, and the processor number is incremented or decremented from cycle to cycle. Thus, the processor that is set in the inoperable state is switched.

According to the processor system and the control method of the present embodiment, the following advantageous effect (7) can be obtained in addition to the advantageous effects (1) to (6) that have been described in connection with the first to fourth embodiments.

(7) An Increase in Temperature of the Multi-Core Processor can be Suppressed, and the Temperature of the Multi-Core Processor can be Made Uniform.

According to this embodiment, the processor that does not operate is intentionally provided and is dynamically switched. With the provision of the processor that does not operate, the increase in temperature of the multi-core processor 10 can effectively be suppressed. From cycle to cycle, the processor that is set in the inoperable state is switched. Therefore, it becomes possible to prevent a local increase/decrease in the temperature distribution of the multi-core processor, and to make uniform the temperature of the multi-core processor.

As a result, the characteristics of the processors, which depend on temperatures, become substantially equal within the multi-core processor 10, and local non-uniformity in characteristics of the processors can be prevented.

Figure 34:
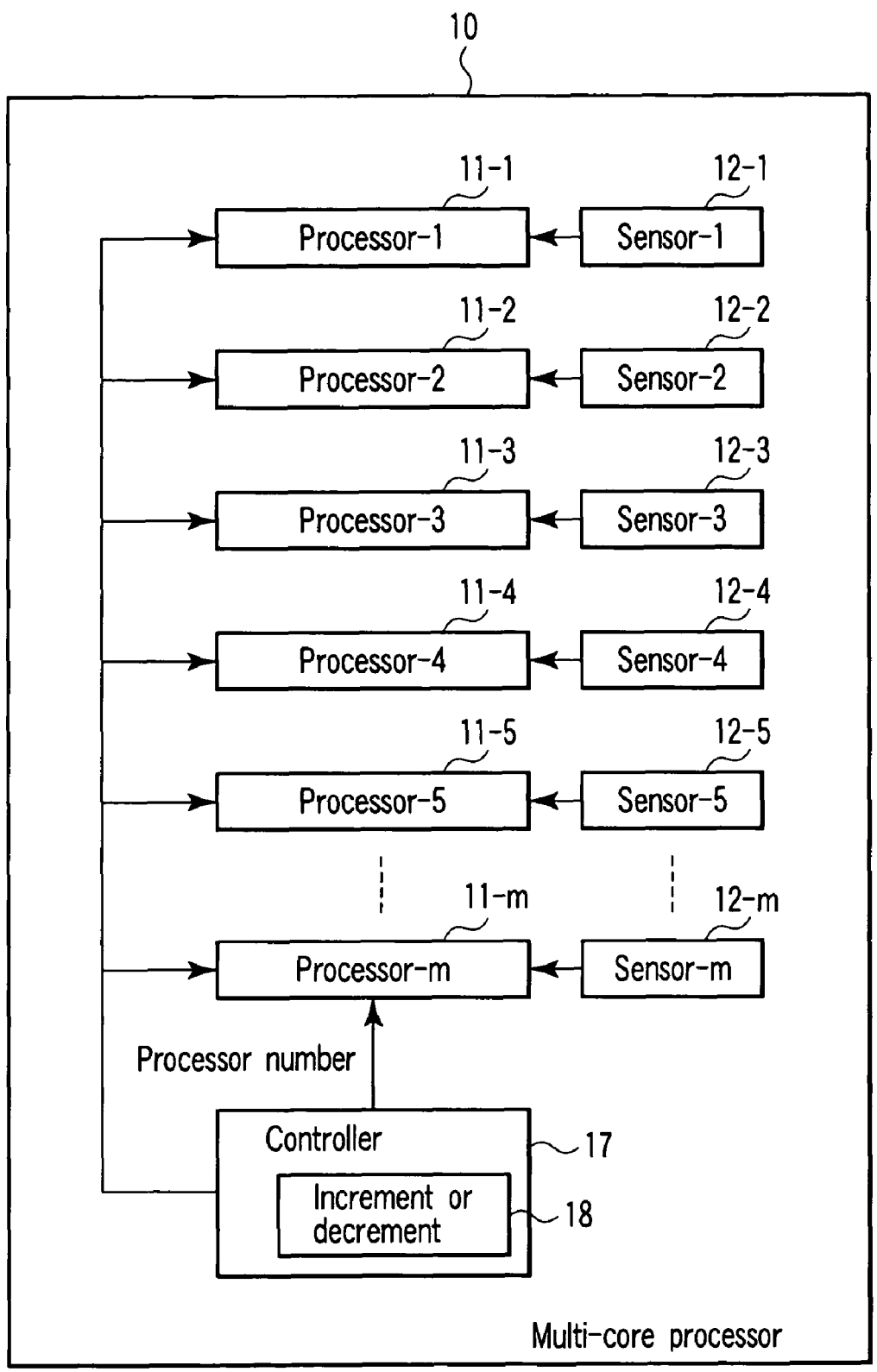
FIG. 34 is a block diagram of the multi-core processor that is included in the processor system according to the fifth embodiment of the invention.

The above-described method may be realized by using dedicated hardware, as shown in FIG. 34. FIG. 34 is a block diagram of the multi-core processor 10. As is shown in FIG. 34, the multi-core processor 10 includes a controller 17 that controls the processors 11-1 to 11-$m$. The controller 17 stores processor numbers, and forcibly sets any one of the processors 11-1 to 11-$m$, which correspond to the processor numbers, in the inoperable state. For example, in the case where the processor 11-$m$ executes task dispatch, the controller 17 informs the processor 11-$m$ as to which processor is to be set in the inoperable state. The controller 17 includes an increment unit or a decrement unit 18. Each time the cycle changes, the processor number is incremented or decremented. The processor 11-$m$ dispatches tasks to the processors, except the processor that is set in the inoperable state by the controller 17.

Next, a processor system and a control method thereof according to a sixth embodiment of the present invention are described. In the sixth embodiment, a processor for emergency use, which executes a task with high priority, is provided in the first to fifth embodiments.

The operation of the multi-core processor 10 according to the sixth embodiment is described referring to FIG. 35. FIG. 35 is a block diagram of the multi-core processor 10, and illustrates a transition of the operations with the passing of time. As is shown in FIG. 35, the processor 11-$m$ uses the processor 11-1 for an emergency. In the cycle times 1 to 3, the processor 11-$m$ sets aside the processor 11-1 from objects of task scheduling. The processor 11-$m$ executes scheduling and task dispatch for the processors 11-2 to 11-($m$−1).

Assume now that the temperature of the multi-core processor 10 generally increases as the operations progress, and no processor become available for re-scheduling in the cycle time 4. Then, the processor 11-$m$ dispatches the task with the highest priority to the processor 11-1 that has been set aside for emergency use from the objects of scheduling. At the same time, the operations of the other processors 11-2 to 11-($m$−1) are stopped.

Thereafter, if the temperature of the multi-core processor 10 lowers, the operation of the processor 11-1 is stopped, as in the cycle times 1 to 3, and tasks are dispatched to the processors 11-2 to 11-($m$−1) as objects of scheduling.

Figure 36:
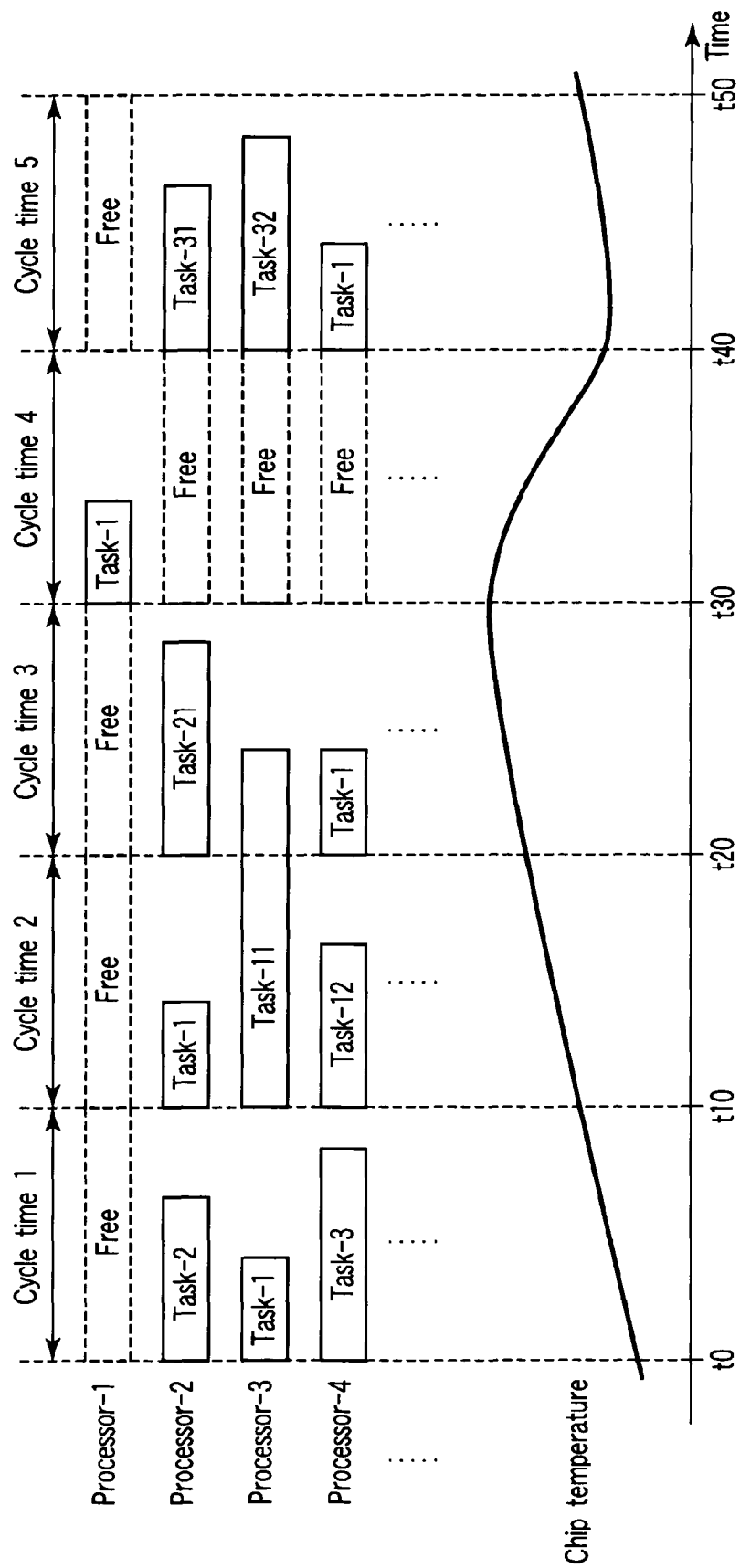
FIG. 36 is a time chart that illustrates the state of the multi-core processor that is included in the processor system according to the sixth embodiment of the invention.

FIG. 36 shows a transition of the operations of the processors and the temperature of the multi-core processor 10 with the passing of time. As is shown in FIG. 36, the temperature of the multi-core processor 10 increases in the cycle times 1 to 3. In the cycle time 4, however, the temperature of the multi-core processor 10 sharply decreases since the operations of the processors 11-2 to 11-($m$−1) are stopped.

As has been described above, according to the processor system and control method of the sixth embodiment, the following advantageous effect (8) can be obtained in addition to the advantageous effects (1) to (7) that have been described in connection with the first to fifth embodiments.

(8) An Increase in Temperature of the Processor System can be Suppressed While a Delay in the Execution of an Application is Prevented.

The multi-core processor 10 according to the sixth embodiment includes the processor 11-1 for emergency use. At a normal operation time, the operation of the processor 11-1 is stopped and the other processors 11-2 to 11-($m$−1) for normal operations execute tasks. However, if the temperature of the multi-core processor 10 reaches a predetermined level or more, all the processors 11-2 to 11-($m$−1) for normal operations are rendered inoperable. Thereby, the multi-core processor is quickly cooled to a sufficiently low temperature. While the processors 11-2 to 11-($m$−1) for normal operations are set in the inoperable state, the processor 11-1 for emergency use is rendered operable. The processor 11-1 executes the task with the highest priority. Therefore, the delay in execution of the application can be suppressed.

Figure 37:
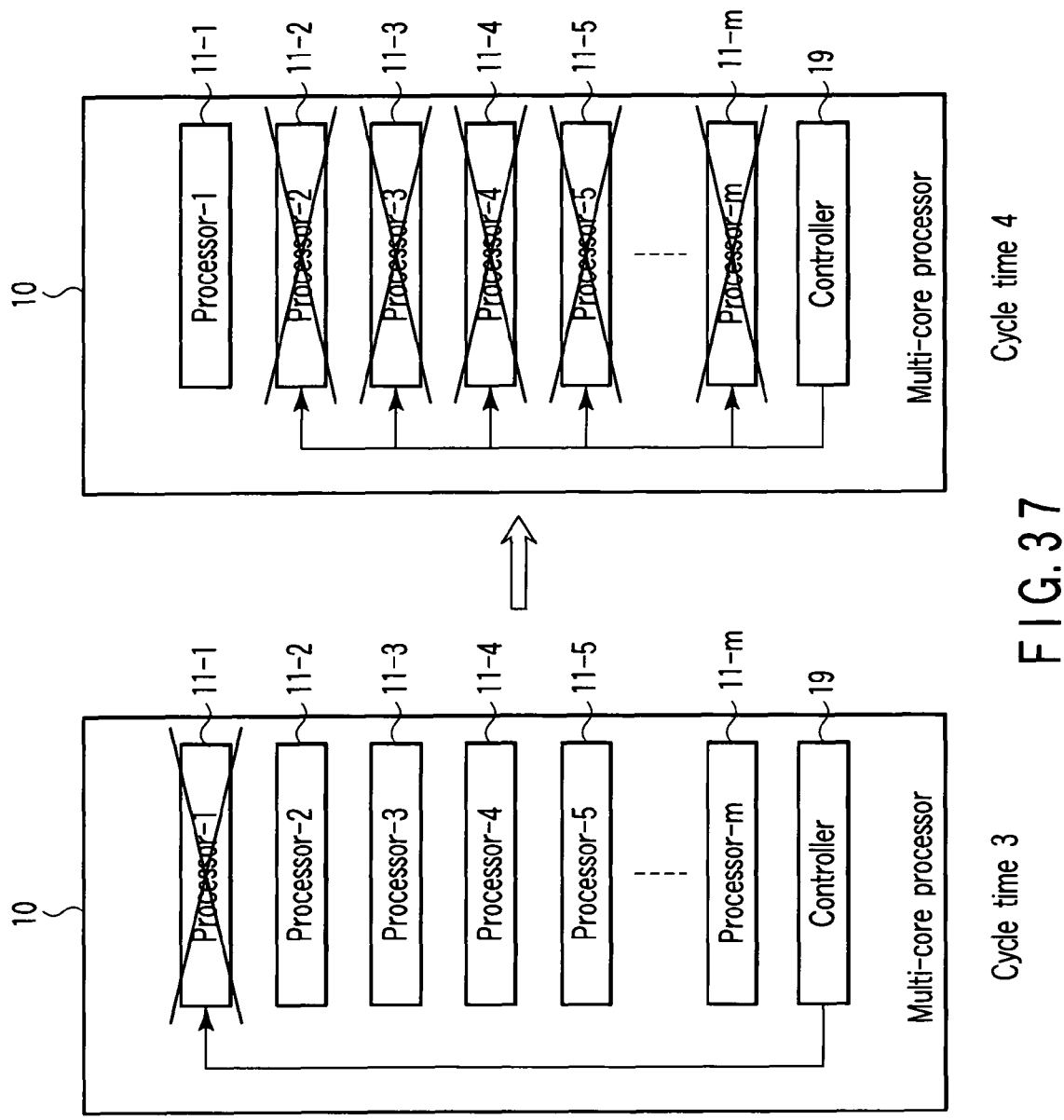
FIG. 37 is a block diagram of the multi-core processor that is included in the processor system according to the sixth embodiment of the invention, FIG. 37 illustrating a transition in operation with time.

In the sixth embodiment, like the fifth embodiment, the operation of the processor may be stopped by a dedicated controller. Specifically, as shown in FIG. 37, a controller 19 is provided in the multi-core processor 10. If the temperature of the multi-core processor 10 is lower than a predetermined level, the controller 19 stops the operation of the processor 11-1 for emergency use. Information relating to this is delivered to the processor 11-$m$. If the temperature of the multi-core processor 10 reaches the predetermined level or more, the operations of the processors 11-2 to 11-(m−1) are stopped and the operation of the processor 11-1 is started. In the case where the processor 11-m executes a control such as task dispatch, it is possible to set not only the processor 11-1 but also the processor 11-m in the operable state. However, the operation of the processor 11-m may be stopped by making the controller 19 temporarily function as the processor 11-m.

According to the processor systems and control methods of the first to sixth embodiments of the invention, the task dispatch is executed in accordance with the current temperatures of the processors and the priority order of tasks. When the temperature of a processor rises, the operation of the processor is stopped and the state of the processor is context-saved in the main memory. In a subsequent cycle time, the suspended process is resumed. Therefore, a decrease in processing performance of the processor system due to the temperature increase can be suppressed.

In the first embodiment, at first, the task with the highest position in the priority order is dispatched to the processor with the lowest temperature. If the expected temperature of the processor exceeds the caution temperature, the operation of this processor is stopped. Of course, a task with a second or lower priority may be re-dispatched to the processor.

In the first to sixth embodiments, the temperature sensors 12-1 to 12-m are provided for the respective processors 11-1 to 11-m. However, it is not necessary to provide the temperature sensor for each of the processors. One temperature sensor may be shared by a plurality of processors, and the temperatures of the processors may be measured by the temperature sensor. Alternatively, a temperature sensor may be disposed at a hot spot (an area with a higher temperature than other areas) on the chip, and the temperature of the processor near the hot spot may be measured.

Figure 38:
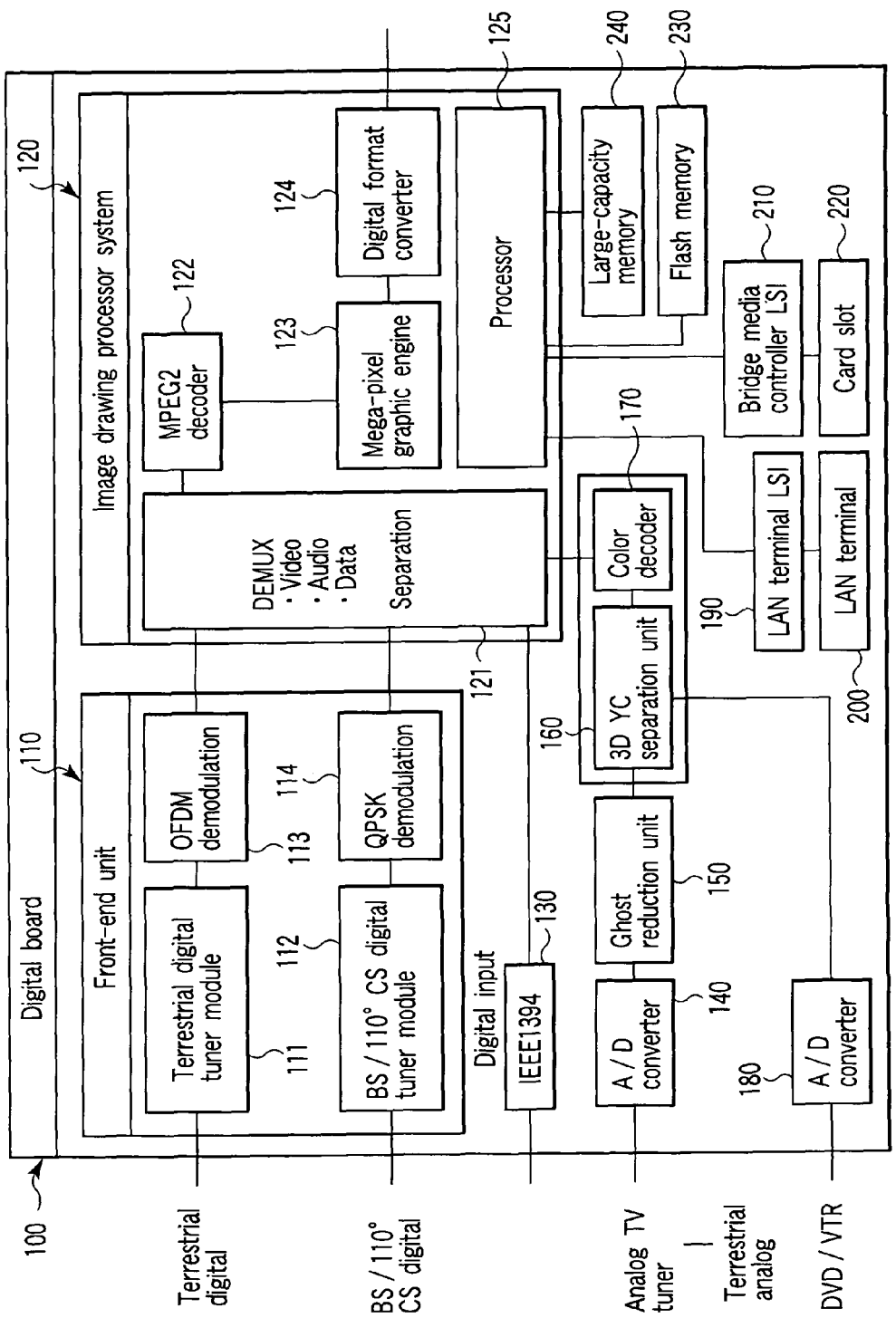
FIG. 38 is a block diagram of a digital board of a digital TV, which includes the processor system according to the first to sixth embodiments of the present invention.

The processor systems according to the first to sixth embodiments can be embedded on, e.g. a game machine, a home server, a TV, or personal digital assistant. FIG. 38 is a block diagram of a digital board that is included in a digital TV with the processor system, which has been described in connection with the first to sixth embodiments. The digital board functions to control communication information such as video and audio. As is shown in FIG. 38, the digital board 100 comprises a front-end unit 110, an image drawing processor system 120, a digital input unit 130, A/D converters 140 and 180, a ghost reduction unit 150, a 3D YC separation unit 160, a color decoder 170, a LAN process LSI 190, a LAN terminal 200, a bridge media controller LSI 210, a card slot 220, a flash memory 230, and a large-capacity memory (e.g. dynamic random access memory (DRAM)) 240. The front-end unit 110 includes digital tuner modules 111 and 112, an OFDM (Orthogonal Frequency Division Multiplex) demodulation unit 113, and a QPSK (Quadrature Phase Shift Keying) demodulation unit 114.

The image drawing processor system 120 comprises a transmission/reception circuit 121, an MPEG2 decoder 122, a graphic engine 123, a digital format converter 124, and a processor 125. For example, the graphic engine 123 and processor 125 correspond to the multi-core processor 10, which have been described in connection with the first to sixth embodiments.

In the above structure, terrestrial digital broadcasting waves, BS (Broadcast Satellite) digital broadcasting waves and 110-degree CS (Communications Satellite) digital broadcasting waves are demodulated by the front-end unit 110. In addition, terrestrial analog broadcasting waves and DVD/VTR signals are decoded by the 3D YC separation unit 160 and color decoder 170. The demodulated/decoded signals are input to the image drawing processor system 120 and are separated into video, audio and data by the transmission/reception circuit 121. As regards the video, video information is input to the graphic engine 123 via the MPEG2 decoder 122.

FIG. 39 is a block diagram of a recording/reproducing apparatus that includes the processor system as described in connection with the first to sixth embodiments. As is shown in FIG. 39, a recording/reproducing apparatus 300 comprises a head amplifier 310, a motor driver 320, a memory 330, an image data control circuit 340, a user I/F CPU 350, a flash memory 360, a display 370, a video output unit 380, and an audio output unit 390.

The image data control circuit 340 includes a memory interface 341, a digital signal processor 342, a processor 343, an audio processor 344, and a video processor 345.

With the above structure, video data that is read out of the head amplifier 310 is input to the image data control circuit 340. Then, graphic data is input from the digital signal processor 342 to the video processor 345. The video processor 345 draws an object on the basis of drawing data. The multi-core processor 10, which has been described in the first to sixth embodiments, corresponds to the processor 343, and the main memory 20 corresponds to the memory 330.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A processor system comprising:
  a plurality of first processors which individually process tasks;
  a temperature sensor which measures a temperature of each of the first processors;
  a main memory which stores programs of the tasks processed by the first processors, and a task priority order table containing a relationship between the tasks and task priority numbers; and
  a second processor which assigns the tasks to the first processors on the basis of the task priority order table and the temperatures of the first processors measured by the temperature sensor,
  wherein the second processor determines an expected temperature to which each of the first processors would reach after a unit time for executing one process,
  the second processor assigns a respective task to only a first processor for which the expected temperature does not exceed a predetermined temperature, the predetermined temperature being an upper limit temperature at which an operation of the first processor is allowed,
  the main memory further stores:
  a first temperature data table containing first data on the upper-limit temperature of each of the first processors;
  a second temperature data table containing second data on an increase in temperature of the first processor when a respective task is processed;
  a third temperature data table containing third data on a drop in temperature of the first processor, the drop in temperature being proportional to a free time occurring after processing the respective task within the unit time; and
  a fourth temperature data table containing fourth data on the expected temperature of the first processor; and the second processor calculates the expected temperature using the current temperature obtained from the temperature sensor, the second data obtained from the second temperature data table, and the third data obtained from the third temperature data table, stores the calculated expected temperature in the fourth temperature data table, and compares the expected temperature and the upper-limit temperature.

2. The system according to claim 1, wherein when the expected temperature exceeds a predetermined temperature, the second processor saves the task assigned to the first processor, and stops an operation of the first processor.

3. The system according to claim 1, wherein the second processor monitors the temperature sensor;
when any one of the first processors reaches the predetermined temperature while the task is being processed, the second processor saves the task in the main memory, and stops the operation of the first processor; and
the main memory includes a context save area in which information relating to the saved task is to be stored.

4. The system according to claim 1, wherein the main memory further stores a task assignment table containing information on correspondence between the first processors and the tasks assigned to each first processor,
the second processor updates the task assignment table such that a task with a highest priority number in the task priority order table is assigned to the first processor with a lowest temperature, and assigns the tasks to the first processors in accordance with information in the task assignment table.

5. The system according to claim 1, wherein the main memory further stores a fifth temperature data table containing fifth data on an increase in temperature of the first processor due to heat propagation from the other an adjacent first processor,
the second processor calculates the expected temperature by adding the third and fifth data to the current temperature, and subtracting the third data.

6. A control method of a processor system having a plurality of processors, comprising:
measuring, at the processor system, temperatures of the plurality of processors;
assigning, at the processor system, tasks to the processors in accordance with a process priority order and the temperatures of the processors;
determining, at the processor system, an expected temperature to which each of the processors would reach after a unit time for executing one process;
causing, at the processor system, a processor, when the expected temperature of which exceeds a predetermined temperature, to save the task assigned to the processor to a main memory;
causing, at the processor, when the expected temperature of which does not exceed the predetermined temperature, to process the assigned task,
wherein the determining the expected temperature includes:
obtaining a first temperature by referring to a first temperature data table containing data on an increase in temperature of the processor when the task is processed;
obtaining a second temperature by referring to a second temperature data table containing data on a drop in temperature of the processor, the drop in temperature being proportional to a free time occurring after processing the task within the unit time;
adding a current temperature of the processor and the first temperature obtained from the first temperature data table; and
subtracting a second temperature obtained from the second temperature data table from the added result of the current temperature and the first temperature, and
setting a subtraction result obtained by subtracting the second temperature from the added result of the current temperature and the first temperature as the expected temperature.

7. The method according to claim 6, wherein the task with a highest priority number in a task priority order table is assigned to the processor with the lowest measured temperature.

8. The method according to claim 6, further comprising re-assigning, when the task with a high priority number is saved, the task to any one of the other processors.

9. The method according to claim 6, further comprising:
saving the task, which is being processed by any one of the processors, to the main memory if the temperature of the any one of the processors reaches the predetermined temperature in execution of the task;
stopping the operation of the processor, a temperature of which reaches the predetermined temperature; and
re-assigning the task, which is saved, to any one of the other processors.

10. The method according to claim 9, wherein when the task is saved to the main memory, contents of a register and a memory, which are provided in the processor, are stored in the main memory, whereby a state of the processor is saved, and
when the task is re-assigned to the any one of the other processors, the state of the processor, which is stored by saving the task, is read out of the main memory, whereby the any one of the other processors is caused to resume the task.

11. A control method of a processor system having a plurality of processors, comprising:
measuring, at the processor system, temperatures of the plurality of processors;
determining, at the processor system, tasks that are to be assigned to the processors in accordance with a process priority order and the temperatures of the processors;
determining, at the processor system, an expected a temperature each processor would reach after a unit time for executing one process;
assigning, at the processor system, no task to a processor, when the expected temperature of which exceeds a predetermined temperature, and assigning the task to the processor, when the expected temperature does not exceed the predetermined temperature; and
causing, at the processor system, the processor, to which the task is assigned, to process the task,
wherein the determining the expected temperature includes:
obtaining a first temperature by referring to a first temperature data table containing data on an increase in temperature of the processor when the task is processed;
obtaining a second temperature by referring to a second temperature data table containing data on a drop in temperature of the processor, the drop in temperature being proportional to a free time occurring after processing the task within the unit time;
adding a current temperature of the processor and the first temperature obtained from the first temperature data table; and subtracting a second temperature obtained from the second temperature data table from the added result of the current temperature and the first temperature, and a subtraction result obtained by subtracting the second temperature from the added result is set as the expected temperature.

12. The method according to claim 11, wherein the task with a highest priority number is assigned to the processor with the lowest measured temperature.

13. The method according to claim 11, further comprising:

saving the task, which is being processed by any one of the processors, to the main memory if the temperature of the any one of the processors reaches the predetermined temperature in execution of the task;

stopping the operation of the processor, a temperature of which reaches the predetermined temperature; and re-assigning the task, which is saved, to any one of the other processors.

14. The method according to claim 13, wherein when the task is saved to the main memory, contents of a register and a memory, which are provided in the processor, are stored in the main memory, whereby a state of the processor is saved, and when the task is re-assigned to the any one of the other processors, the state of the processor, which is stored by saving the task, is read out of the main memory, whereby the any one of the other processors is caused to resume the task.

* * * * *